United States Patent
Komae et al.

(10) Patent No.: US 11,047,589 B2
(45) Date of Patent: Jun. 29, 2021

(54) AIR BLOWER AND AIR BLOWING SYSTEM

(71) Applicants: Mitsubishi Electric Corporation, Tokyo (JP); Mitsubishi Electric Home Appliance Co., Ltd., Saitama (JP)

(72) Inventors: Sota Komae, Tokyo (JP); Ayumi Saiki, Tokyo (JP); Akira Shiga, Tokyo (JP); Yosuke Kuge, Saitama (JP); Yoshitaka Akari, Saitama (JP); Kazuo Nyui, Saitama (JP); Takuya Furuhashi, Tokyo (JP); Atsushi Shinno, Tokyo (JP); Kiyoshi Watanabe, Tokyo (JP); Masami Hagiwara, Tokyo (JP)

(73) Assignees: Mitsubishi Electric Corporation, Tokyo (JP); Mitsubishi Electric Home Appliance Co., Ltd., Fukaya (JP)

( * ) Notice: Subject to any disclaimer, the term of this patent is extended or adjusted under 35 U.S.C. 154(b) by 690 days.

(21) Appl. No.: 15/556,338

(22) PCT Filed: Aug. 31, 2015

(86) PCT No.: PCT/JP2015/074759
§ 371 (c)(1),
(2) Date: Sep. 7, 2017

(87) PCT Pub. No.: WO2016/157568
PCT Pub. Date: Oct. 6, 2016

(65) Prior Publication Data
US 2018/0100667 A1  Apr. 12, 2018

(30) Foreign Application Priority Data

Mar. 30, 2015  (WO) .................. PCT/JP2015/059993

(51) Int. Cl.
*F24F 11/74* (2018.01)
*F24F 3/16* (2021.01)
(Continued)

(52) U.S. Cl.
CPC ................ *F24F 11/74* (2018.01); *F24F 3/16* (2013.01); *F24F 11/52* (2018.01); *F24F 11/79* (2018.01);
(Continued)

(58) Field of Classification Search
CPC .. F24F 11/74; F24F 11/89; F24F 11/79; F24F 11/523; F24F 11/80
See application file for complete search history.

(56) References Cited

U.S. PATENT DOCUMENTS

2005/0173549 A1*  8/2005  Bash .................. G05D 23/1932
236/51
2010/0101264 A1  4/2010  Nishino et al.
(Continued)

FOREIGN PATENT DOCUMENTS

| CN | 1210229 A | 3/1999 |
| CN | 101900400 A | 12/2010 |

(Continued)

OTHER PUBLICATIONS

International Preliminary Report on Patentability dated Oct. 12, 2017 for the corresponding international application No. PCT/JP2015/074759 (English translation only).
(Continued)

*Primary Examiner* — Steven B McCallister
*Assistant Examiner* — Charles R Brawner
(74) *Attorney, Agent, or Firm* — Posz Law Group, PLC

(57) ABSTRACT

An air blowing device and an air blowing system reduces a region where a person cannot be recognized in a space provided with the air blower, and achieves control of the air blower in view of a person in a larger range in the space. The air blower includes: a first sensor configured to detect a position of a human in a first human detection range; a receiver configured to receive a detection result of a second
(Continued)

sensor transmitted from a transmitter of a sensor-mounted device, the sensor-mounted device including the second sensor configured to detect a position of a human in a second human detection range; and a controller configured to perform air blowing control when the first sensor does not detect a human in the first human detection range and the second sensor detects a human in the second human detection range.

9 Claims, 16 Drawing Sheets

(51) Int. Cl.
    *F24F 11/52*     (2018.01)
    *F24F 11/79*     (2018.01)
    *F24F 11/89*     (2018.01)
    *F24F 120/12*     (2018.01)
    *F24F 11/523*     (2018.01)
    *F24F 11/80*     (2018.01)

(52) U.S. Cl.
    CPC .............. *F24F 11/89* (2018.01); *F24F 11/523* (2018.01); *F24F 11/80* (2018.01); *F24F 2120/12* (2018.01)

(56) References Cited

U.S. PATENT DOCUMENTS

| | | | | |
|---|---|---|---|---|
| 2010/0325570 | A1* | 12/2010 | Horiuchi | F24F 11/30 |
| | | | | 715/771 |
| 2012/0012297 | A1* | 1/2012 | Nakagawa | 165/247 |
| 2014/0107846 | A1 | 4/2014 | Li | |
| 2015/0012142 | A1 | 1/2015 | Koga | |
| 2015/0233598 | A1* | 8/2015 | Shikii | F24F 11/79 |
| | | | | 165/244 |
| 2016/0178225 | A1* | 6/2016 | Vallikannu | F24F 11/62 |
| | | | | 700/276 |
| 2018/0100667 | A1 | 4/2018 | Komae et al. | |

FOREIGN PATENT DOCUMENTS

| | | |
|---|---|---|
| EP | 2 060 857 A1 | 5/2009 |
| JP | H02-245212 A | 10/1990 |
| JP | H06-174546 A | 6/1994 |
| JP | H11-083112 A | 3/1999 |
| JP | 2000-035487 A | 2/2000 |
| JP | 2001-304653 A | 10/2001 |
| JP | 2001304653 A * | 10/2001 |
| JP | 2005-121316 A | 5/2005 |
| JP | 2006084150 A * | 3/2006 |
| JP | 2007-196183 A | 8/2007 |
| JP | 2008-267795 A | 11/2008 |
| JP | 2008267795 A * | 11/2008 |
| JP | 2010-181081 A | 8/2010 |
| JP | 2011-208936 A | 10/2011 |
| JP | 2013-200098 A | 10/2013 |
| JP | 2013-242226 A | 12/2013 |
| JP | 2014-077599 A | 5/2014 |
| JP | 2014-137212 A | 7/2014 |
| JP | 2015-014422 A | 1/2015 |
| WO | 2008/088020 A1 | 7/2008 |
| WO | 2016/157568 A1 | 10/2016 |

OTHER PUBLICATIONS

International Preliminary Report on Patentability dated Oct. 12, 2017 for the corresponding international application No. PCT/JP20151074759 (English translation only).
International Search Report of the International Searching Authority dated Nov. 17, 2015 for the corresponding international application No. PCT/JP2015/074759 (and English translation).
Office Action dated May 10, 2017 issued in corresponding TW patent application No. 105107732 (and partial English tanslation).
Office action dated May 7, 2019 issued in corresponding JP patent application No. 2018-150396 (and English translation).
Office action dated Jun. 26, 2019 issued in corresponding CN patent application No. 2015800779456 (and English translation).
Office Action dated Oct. 8, 2019 issued in corresponding JP patent application No. 2018-150396 (and English translation).
Office action dated Mar. 6, 2018 issued in corresponding JP patent application No. 2017-509142 (and English translation thereof).
Office Action corresponding to Japanese Patent Application No. 2017-509142 dated Jun. 26, 2018 with English translation.
Office action dated Jun. 25, 2018 issued in corresponding TW patent application No. 105107732 (and English translation thereof).
Office Action dated Feb. 25, 2020 issued in corresponding JP patent application No. 2018-150396 (and English translation).

\* cited by examiner

FIG. 7
(a)
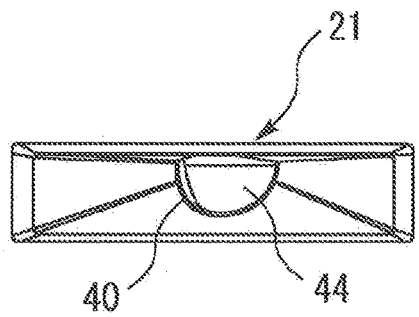
(b)
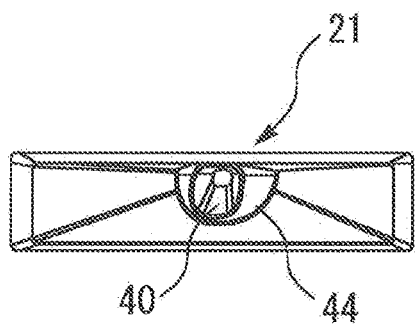
(c)
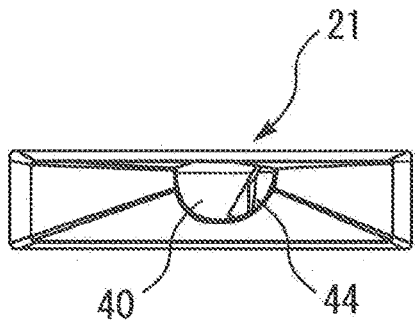

1: AIR BLOWER
6: AIR BLOWING DEVICE
9: MOVABLE LOUVER
21: FIRST SENSOR
51: RECEIVING UNIT
52: OPERATION UNIT
53: TIME OBTAINING UNIT
54: FIRST MAIN CONTROL UNIT
55: STORAGE UNIT
60: FIRST INFORMATION PROCESSING UNIT
200: AIR CONDITIONER
201: SECOND SENSOR
202: SECOND INFORMATION PROCESSING UNIT
203: TRANSMISSION UNIT
204: AIR BLOWING MEANS
205: SECOND MAIN CONTROL UNIT

60: FIRST INFORMATION PROCESSING UNIT
61: HUMAN DETECTION UNIT
62: ENVIRONMENTAL INFORMATION OBTAINING UNIT
63: DIFFERENT SENSOR POSITION GRASPING UNIT
64: SENSOR INFORMATION INTEGRATION UNIT
65: DIFFERENT DEVICE AIR BLOWING STATE OBTAINING UNIT

403

403

1: AIR BLOWER
6: AIR BLOWING DEVICE
9: MOVABLE LOUVER
21: FIRST SENSOR
51: RECEIVING UNIT
52: OPERATION UNIT
53: TIME OBTAINING UNIT
54: FIRST MAIN CONTROL UNIT
55: STORAGE UNIT
56: DISPLAY UNIT
60: FIRST INFORMATION PROCESSING UNIT
200: AIR CONDITIONER
201: SECOND SENSOR
202: SECOND INFORMATION PROCESSING UNIT
203: TRANSMISSION UNIT
204: AIR BLOWING MEANS
205: SECOND MAIN CONTROL UNIT

60: FIRST INFORMATION PROCESSING UNIT
61: HUMAN DETECTION UNIT
62: ENVIRONMENTAL INFORMATION OBTAINING UNIT
65: DIFFERENT DEVICE AIR BLOWING STATE OBTAINING UNIT
66: HUMAN PRESENCE DETECTION UNIT

1: AIR BLOWER
6: AIR BLOWING DEVICE
9: MOVABLE LOUVER
21: FIRST SENSOR
51: RECEIVING UNIT
52: OPERATION UNIT
53: TIME OBTAINING UNIT
54: FIRST MAIN CONTROL UNIT
55: STORAGE UNIT
60: FIRST INFORMATION PROCESSING UNIT
200: AIR CONDITIONER
201: SECOND SENSOR
202: SECOND INFORMATION PROCESSING UNIT
203: TRANSMISSION UNIT
205: SECOND MAIN CONTROL UNIT

AIR BLOWER AND AIR BLOWING SYSTEM

CROSS REFERENCE TO RELATED APPLICATIONS

This application is a U.S. national stage application of International Application No. PCT/JP2015/074759 filed on Aug. 31, 2015, and is based on International Application No. PCT/JP2015/059993 filed on Mar. 30, 2015, the disclosures of which are incorporated herein by reference.

FIELD

The present invention relates to an air blower and an air blowing system.

BACKGROUND

Conventionally, for example, PTL 1 discloses an air purifier (air blower) capable of changing an orientation of an inlet. More specifically, the air purifier includes a sensor for scanning inside of a room to detect a human. Then, a body of the air purifier is rotated so that the inlet placed in a front surface of the body is oriented to the human.

CITATION LIST

Patent Literature

[PTL 1] Japanese Patent Laid-Open No. 2-245212

SUMMARY

Technical Problem

However, the conventional air blower disclosed in PTL 1 cannot detect a human outside of a detection range of the sensor included in the air blower. Also, even within the detection range of the sensor, it is difficult to detect a human in a blind spot of the sensor due to furniture or the like in a room. Thus, even if there is a human in a room provided with the air blower, the sensor cannot detect the human, and although there is the human, the air blower cannot blow air with a consideration for the human.

The present invention is achieved to solve such a problem, and has an object to provide an air blower and an air blowing system capable of reducing a region where the air blower cannot recognize a human in a space provided with the air blower, and capable of achieving control of the air blower with a consideration for a human within a wider range in the space.

Solution to Problem

An air blower according to the present invention includes: a first sensor configured to detect a position of a human in a first human detection range; a receiver configured to receive a detection result of a second sensor transmitted from a transmitter of a sensor-mounted device, the sensor-mounted device including: the second sensor configured to detect a position of a human in a second human detection range, and the transmitter configured to transmit the detection result of the second sensor; and a controller configured to perform, when the first sensor does not detect a human in the first human detection range and the second sensor detects a human in the second human detection range, air blowing control which change a direction of outlet air to outside of the first human detection range.

Or an air blower according to the present invention includes: An air blower comprising: a first sensor configured to detect a position of a human in a first human detection range; a receiver configured to receive a detection result of a second sensor transmitted from a transmitter of a sensor-mounted device, the sensor-mounted device including: the second sensor configured to detect a position of a human in a second human detection range, and the transmitter configured to transmit the detection result of the second sensor, and a controller configured to perform air blowing control which changes any one or more of a direction, an amount and a speed of supply air, and a direction, an amount and a speed of outlet air, temperature, humidity, and a degree of purification based on the detection result of the first sensor and the detection result of the second sensor received by the receiver.

An air blowing system according to the present invention includes: an air blower including a first sensor configured to detect a position of a human in a first human detection range; and a sensor-mounted device including a second sensor configured to detect a position of a human in a second human detection range, the sensor-mounted device further including a transmitter configured to transmit a detection result of the second sensor, the air blower further including: a receiver configured to receive the detection result of the second sensor transmitted from the transmitter, and a first controller configured to perform air blowing control which changes any one or more of a direction, an amount and a speed of supply air, and a direction, an amount and a speed of outlet air, temperature, humidity, and a degree of purification based on the detection result of the first sensor and the detection result of the second sensor received by the receiver.

Or an air blowing system according to the present invention includes: an air blower including a first sensor configured to detect a position of a human in a predetermined human detection range; and a sensor-mounted device provided in a position different from a position of the air blower in a space provided with the air blower, and including a second sensor configured to detect a physical amount which changes depending on presence or absence of a human in the space, the sensor-mounted device further including a transmitter configured to transmit a detection result of the second sensor, the air blower further including: a receiver configured to receive the detection result of the second sensor transmitted from the transmitter; and a controller configured to perform air blowing control which changes any one or more of a direction, an amount and a speed of supply air, and a direction, an amount and a speed of outlet air, temperature, humidity, and a degree of purification based on the detection result of the first sensor and the detection result of the second sensor received by the receiver.

Or an air blowing system according to the present invention includes: an air blower including a first sensor configured to detect a position of a human in a predetermined human detection range; and a portable sensor-mounted device carried by a human in a space provided with the air blower, the sensor-mounted device further including: a second sensor configured to detect a position of the sensor-mounted device in the space; and a transmitter configured to transmit a detection result of the second sensor, the air blower including: a receiver configured to receive the detection result of the second sensor transmitted from the transmitter; and a controller configured to perform air blowing control which changes any one or more of a direction, an amount and a speed of supply air, and a direction, an amount and a speed of outlet air, temperature, humidity, and a degree of purification based on the detection result of the first sensor and the detection result of the second sensor received by the receiver.

Advantageous Effect of Invention

The present invention has an advantage that a region where the air blower cannot recognize a human in a space provided with the air blower may be reduced, and control of the air blower may be achieved with a consideration for a human within a wider range in the space.

BRIEF DESCRIPTION OF THE DRAWINGS

FIG. 7 illustrates rotating operations (a), (b) and (c) of the first sensor.

DESCRIPTION OF EMBODIMENTS

Figure 1:
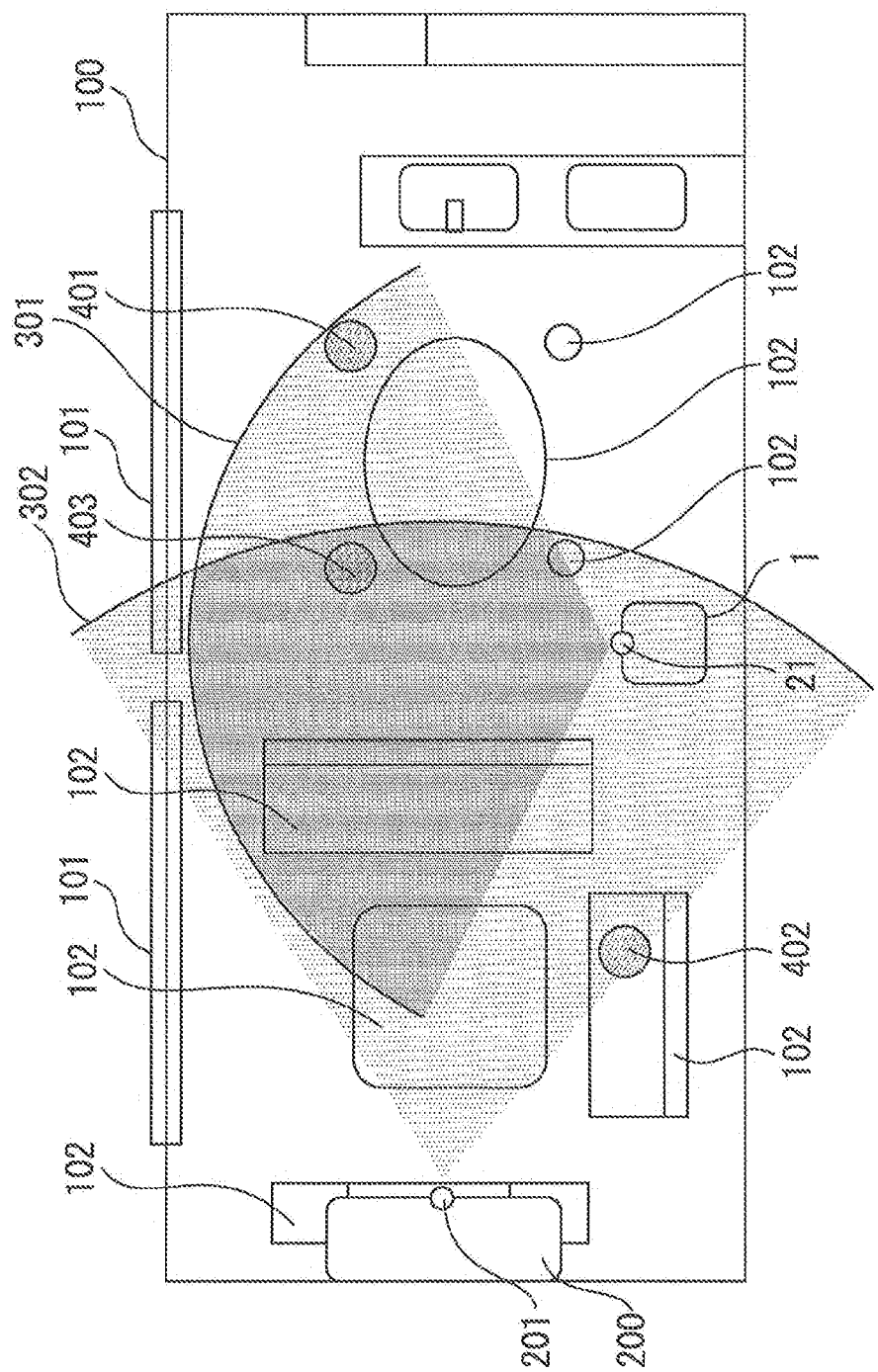
FIG. 1 is a plan view of an example of a room provided with an air blowing system including an air blower according to Embodiment 1 of the present invention.

With reference to the accompanying drawings, embodiments of the present invention will be described. In the drawings, the same or corresponding parts are denoted by the same reference numerals, and overlapping descriptions are simplified or omitted as appropriate. The present invention is not limited to the embodiments described below, but variations may be made without departing from the gist of the present invention.

Embodiment 1

Figure 2:
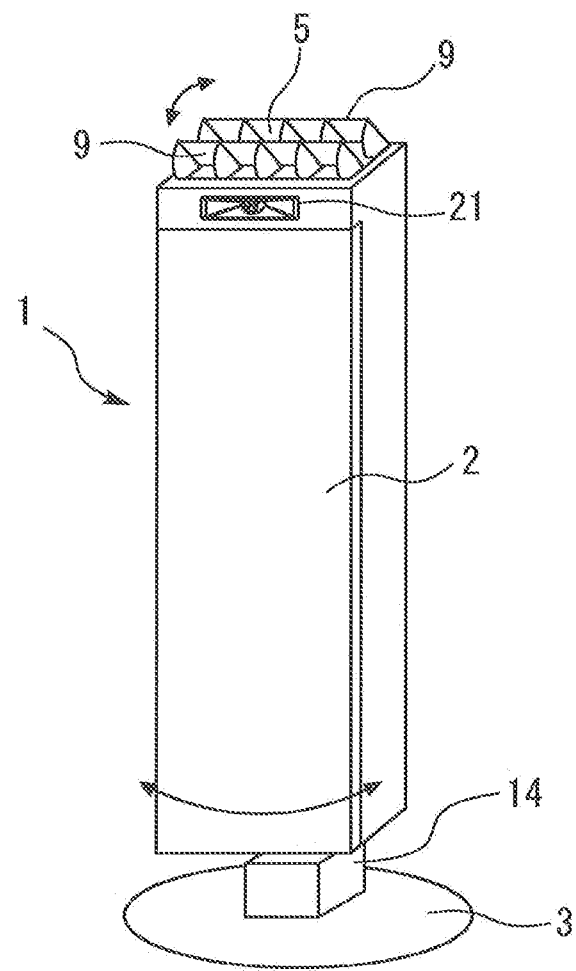
FIG. 2 is a perspective view of an air purifier as an example of an air blower included in the air blowing system according to Embodiment 1 of the present invention.
Figure 3:
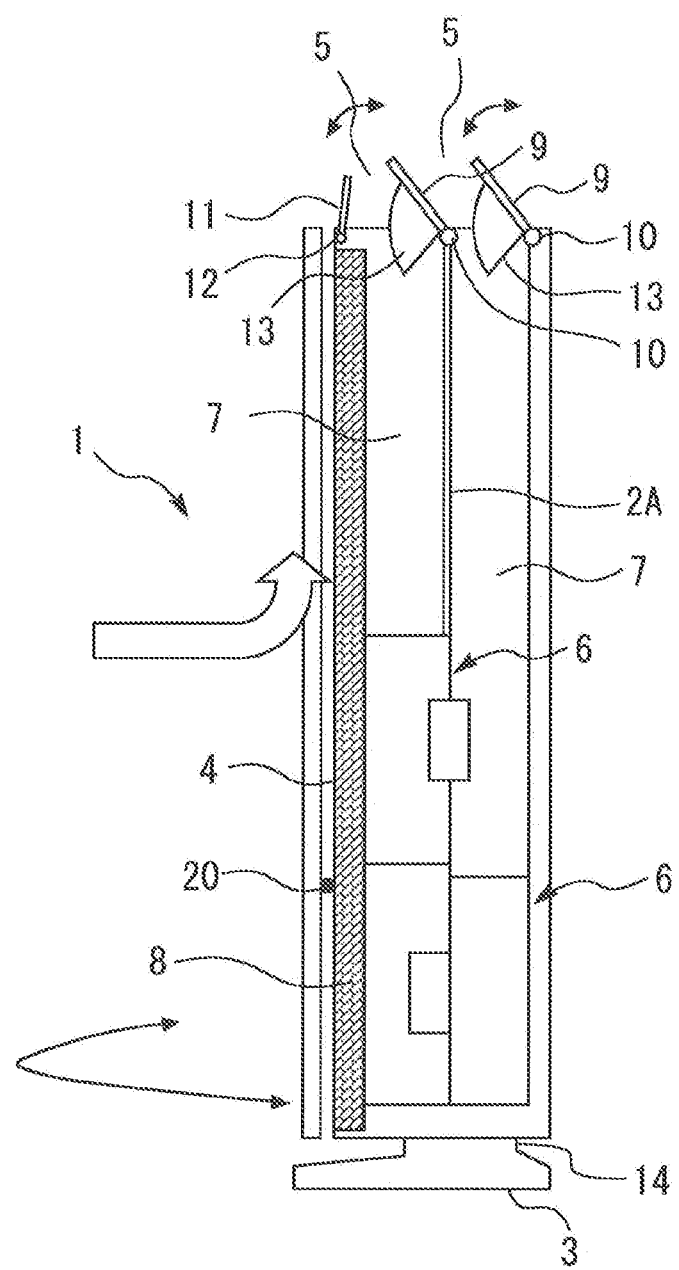
FIG. 3 is a vertical sectional view of the air purifier in FIG. 2.
Figure 4A:
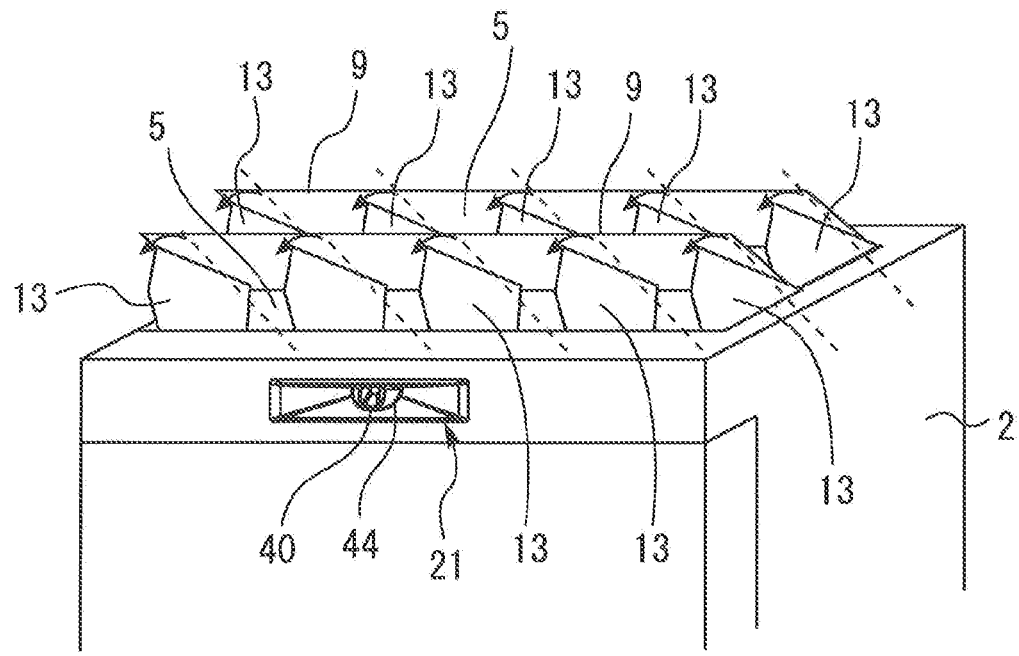
FIGS. 4A and 4B are enlarged views of essential portions in FIG. 2 showing operation states of a movable louver and a rectification mechanism.
Figure 4B:
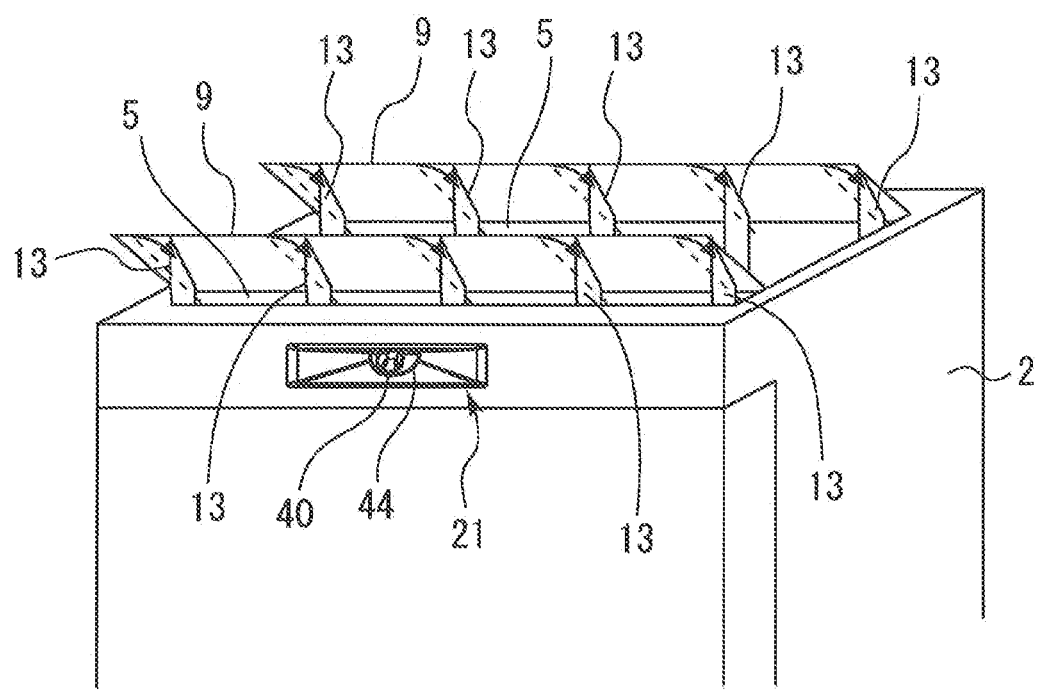
Figure 5:
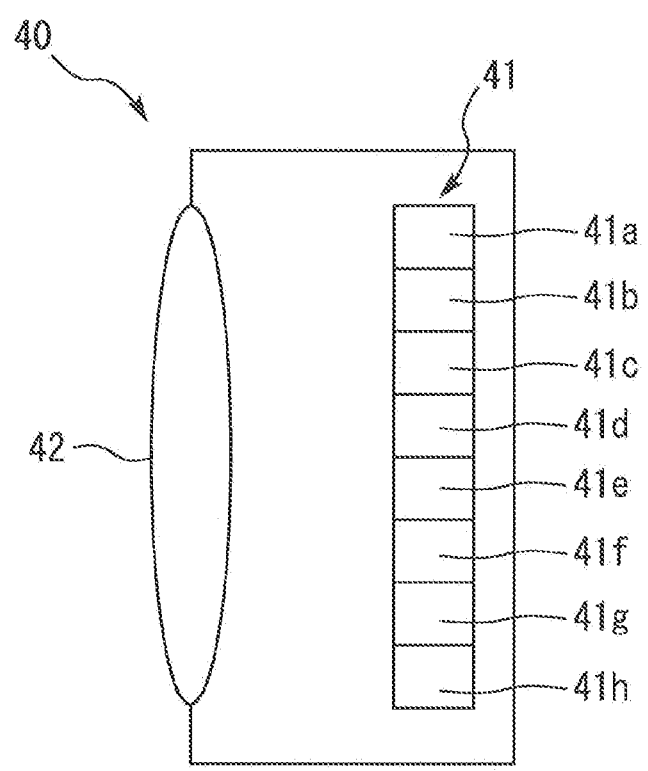
FIG. 5 is a sectional view schematically showing a structure of a first sensor included in the air purifier.
Figure 6:
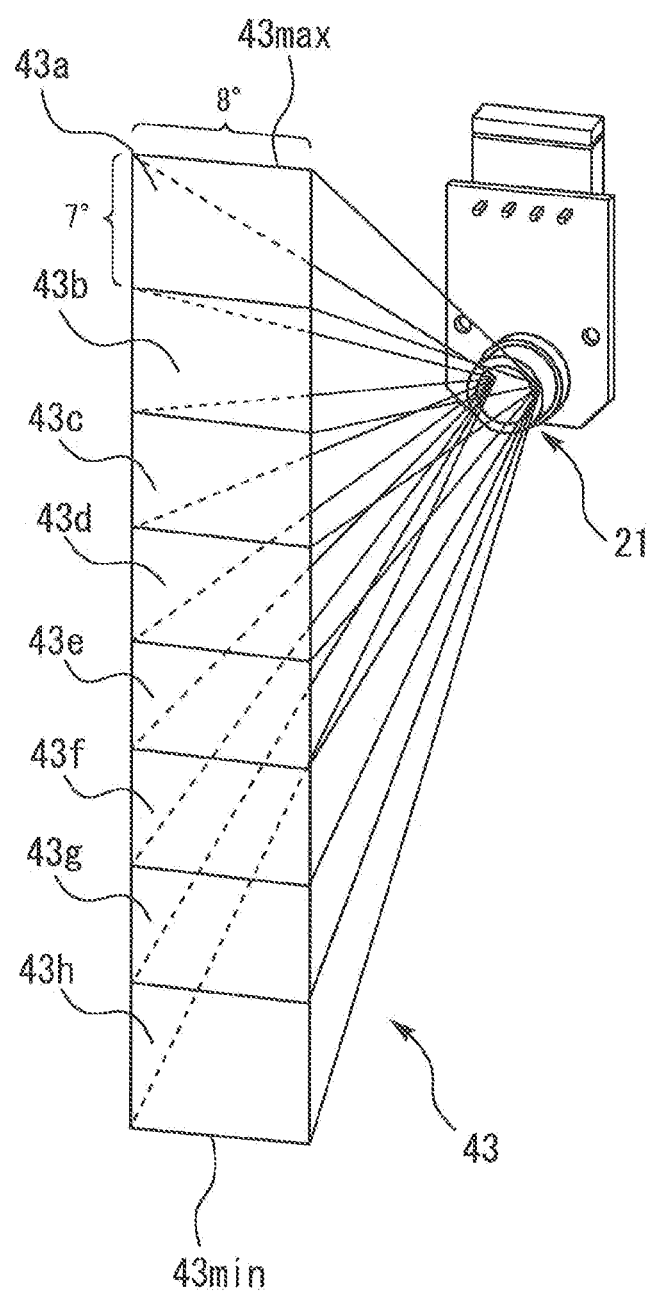
FIG. 6 is a perspective view of an arrangement of light receiving elements included in the first sensor and light distribution viewing angles.
Figure 8:
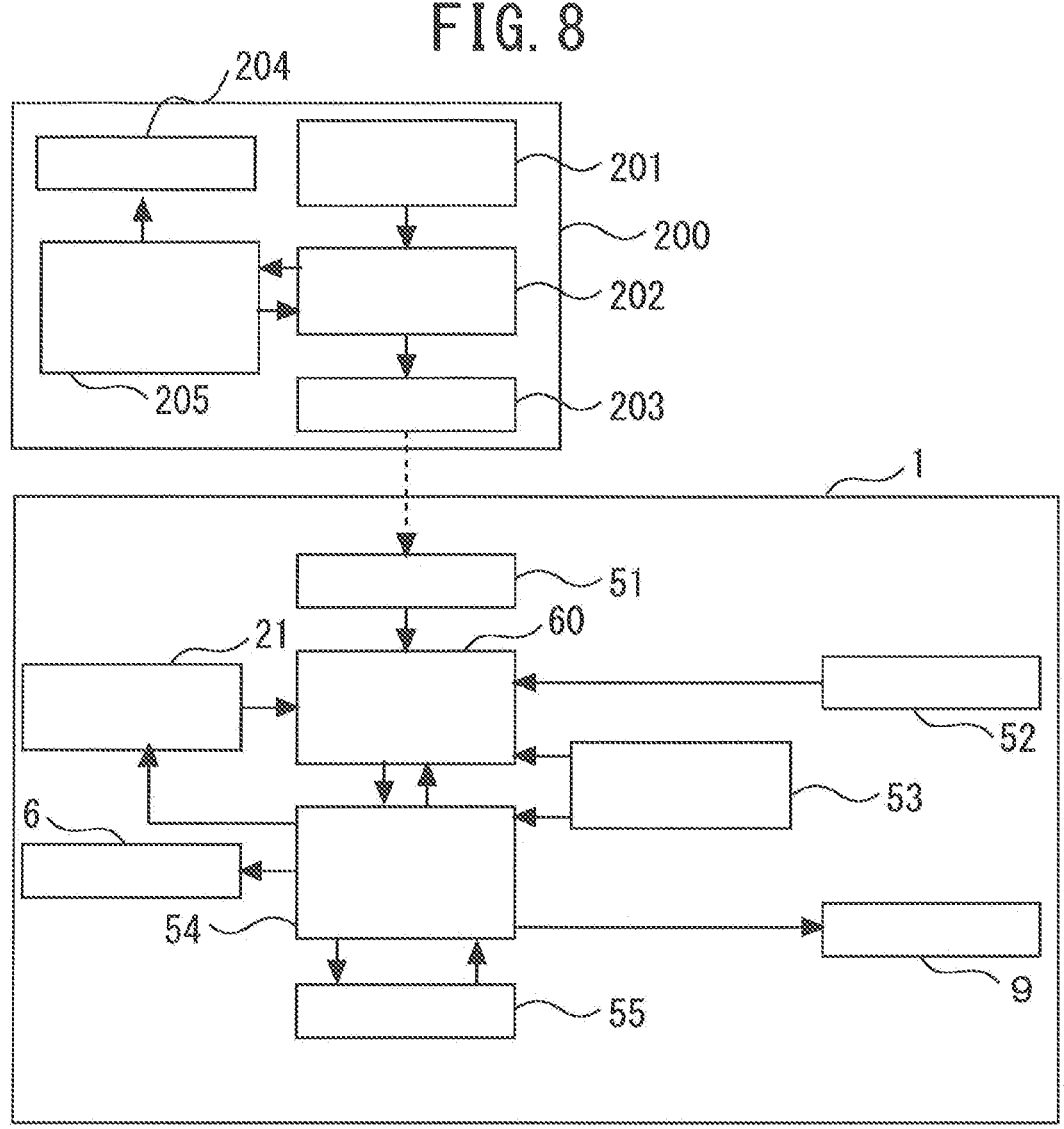
FIG. 8 is a block diagram of a functional configuration of the air blowing system including the air blower according to Embodiment 1 of the present invention.
Figure 9:
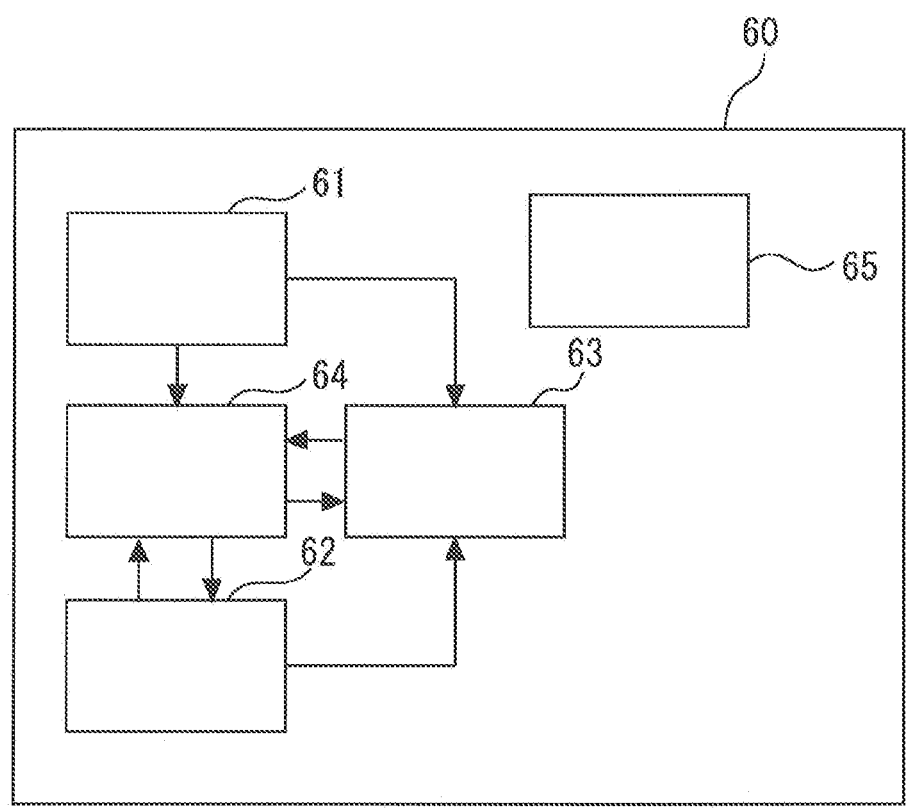
FIG. 9 is a block diagram of an internal configuration of a first information processing unit included in the air blowing system including the air blower according to Embodiment 1 of the present invention.
Figure 10:
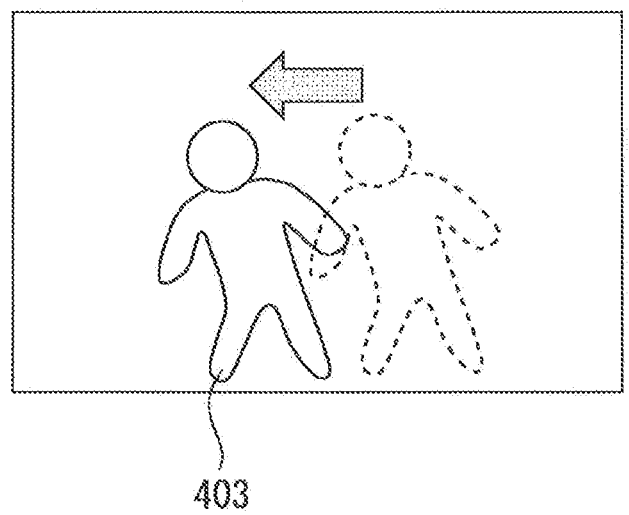
FIG. 10 shows an example of a detection result of the first sensor in a layout in the room shown in FIG. 1.
Figure 11:
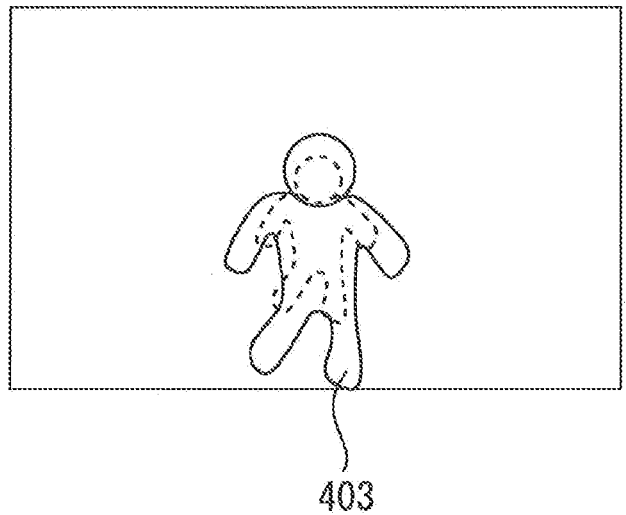
FIG. 11 shows an example of a detection result of a second sensor in the layout in the room shown in FIG. 1.
Figure 12:
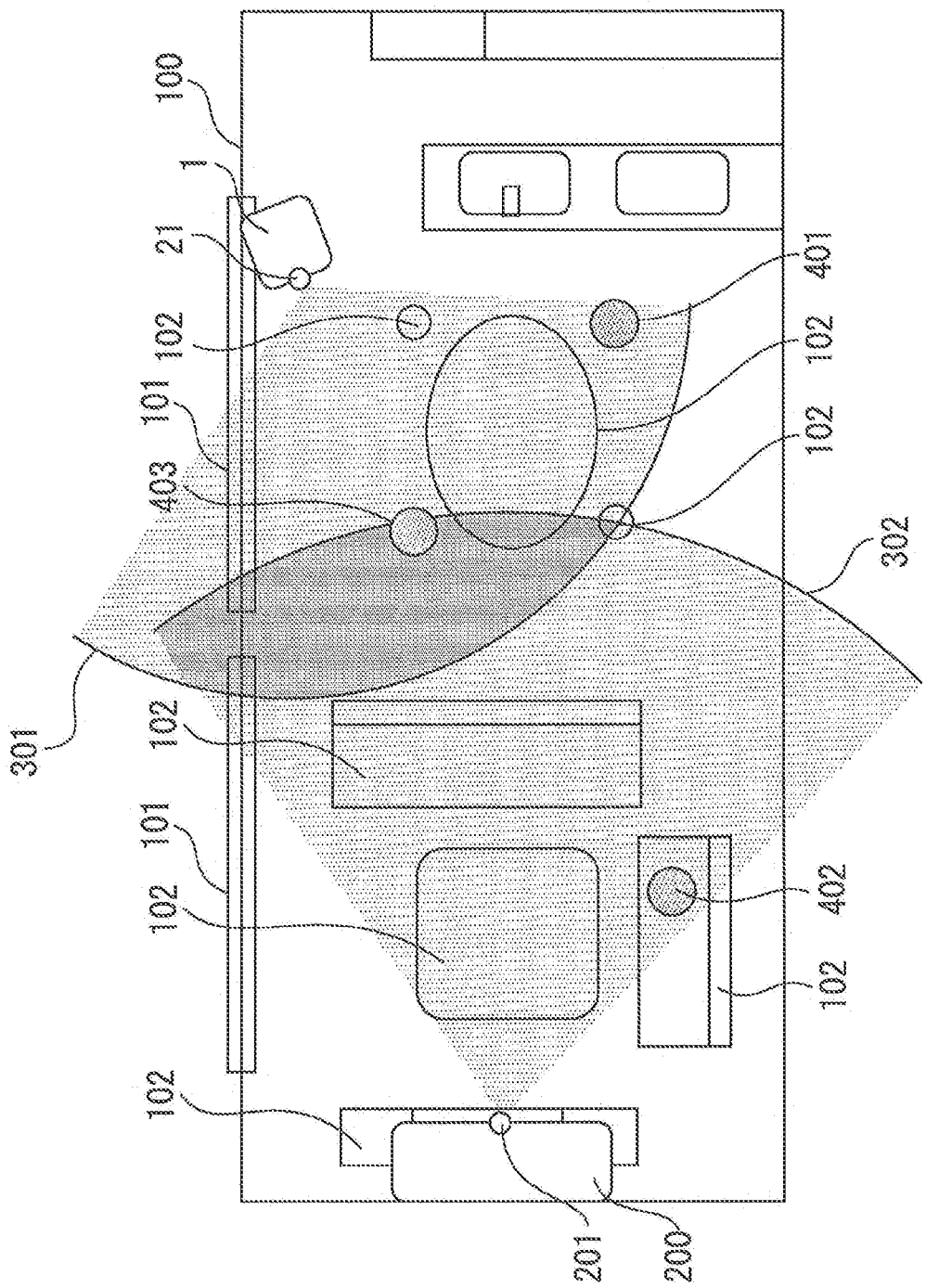
FIG. 12 is a plan view of another example of the room provided with the air blowing system including an air blower according to Embodiment 1 of the present invention.
Figure 13:
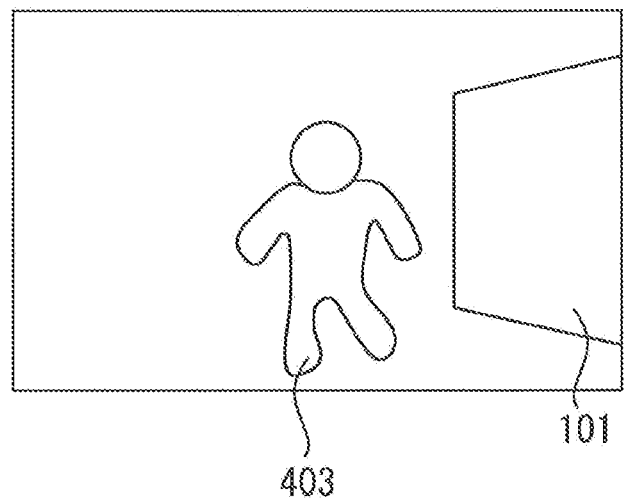
FIG. 13 shows an example of a detection result of the first sensor in a layout in the room shown in FIG. 12.
Figure 14:
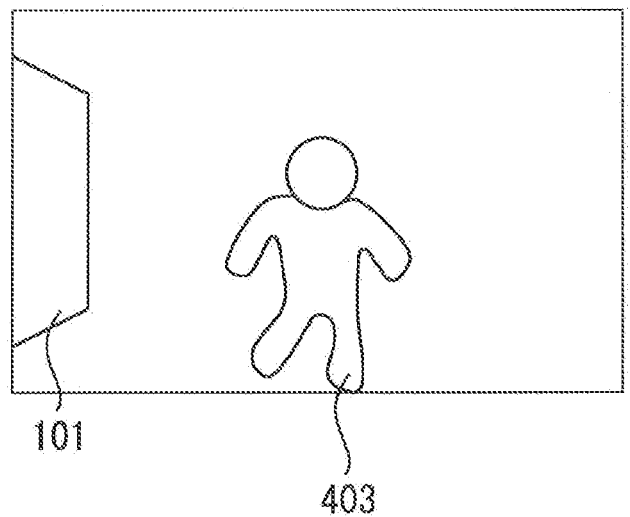
FIG. 14 shows an example of a detection result of the second sensor in the layout in the room shown in FIG. 12.
Figure 15:
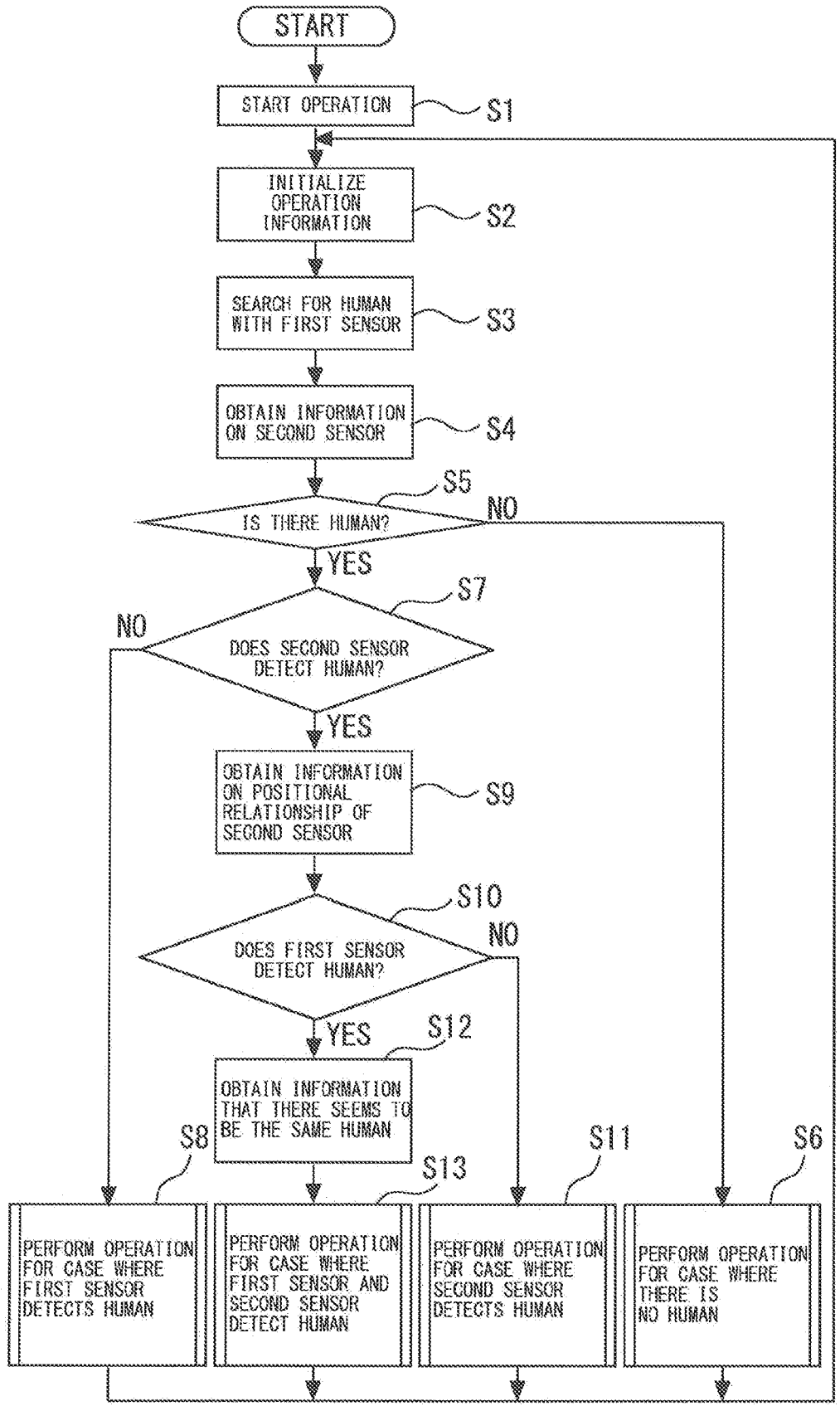
FIG. 15 is a flowchart of an operation of the air blower included in the air blowing system according to Embodiment 1 of the present invention.

FIGS. 1 to 15 relate to Embodiment 1 of the present invention, FIG. 1 is a plan view of an example of a room provided with an air blowing system, FIG. 2 is a perspective view of an air purifier as an example of an air blower included in the air blowing system, FIG. 3 is a vertical sectional view of the air purifier in FIG. 2, FIGS. 4A and 4B are an enlarged view of essential portions in FIG. 2 showing operation states of a movable louver and a rectification mechanism, FIG. 5 is a sectional view schematically showing a structure of a first sensor included in the air purifier, FIG. 6 is a perspective view of an arrangement of light receiving elements included in the first sensor and light distribution viewing angles, FIG. 7 illustrates rotating operations (a), (b) and (c) of the first sensor, FIG. 8 is a block diagram of a functional configuration of the air blowing system, FIG. 9 is a block diagram of an internal configuration of a first information processing unit included in the air blowing system, FIG. 10 shows an example of a detection result of the first sensor in a layout in the room shown in FIG. 1, FIG. 11 shows an example of a detection result of a second sensor in the layout in the room shown in FIG. 1, FIG. 12 is a plan view of another example of the room provided with the air blowing system, FIG. 13 shows an example of a detection result of the first sensor in a layout in the room shown in FIG. 12, FIG. 14 shows an example of a detection result of the second sensor in the layout in the room shown in FIG. 12, and FIG. 15 is a flowchart of an operation of the air blower included in the air blowing system.

FIG. 1 shows inside of a room 100 that is a space to which the air blowing system according to the present invention is applied. As shown in FIG. 1, a window 101 is here provided in a wall of the room 100. The window 101 communicates with outside of the room 100 and may be opened/closed, for example, by a window pain. Furniture 102 is here provided in the room 100. The furniture 102 includes, for example, a sofa, a table, a chair, or the like.

An air purifier 1 and an air conditioner 200 are provided in the room 100. The air purifier 1 and the air conditioner 200 are arranged in different positions in the same space of the room 100. The air purifier 1 is an air blower included in the air blowing system according to this invention. The air conditioner 200 is a sensor-mounted device included in the air blowing system according to this invention.

The air purifier 1 as the air blower includes a first sensor 21. The first sensor 21 is for detecting a position of a human and changes over time in the position of the human within a first human detection range 301 in the mom 100. The air conditioner 200 as the sensor-mounted device includes a second sensor 201. The second sensor 201 is for detecting a position of a human and changes over time in the position of the human within a second human detection range 302 in the room 100. The first human detection range 301 and the second human detection range 302 are predetermined ranges.

Next, with reference to FIGS. 2 to 7, a configuration of the air purifier 1 as the air blower will be further described. The air purifier 1 is here configured as a floor type air purifier. The air purifier 1 includes a casing 2, a base 3, an inlet 4, an outlet 5, an air blowing device 6, an air trunk 7, a purification device 8, a movable louver 9, a louver drive 10, an opening variable mechanism 11, an opening drive 12, a rectification mechanism 13, a horizontal rotation mechanism 14, or the like.

The casing 2 has, for example, a substantially rectangular cylindrical shape. The casing 2 is supported so as to be horizontally rotatable by the base 3 placed on a floor of the room 100. As shown in FIG. 3, in a space from the inlet 4 to the outlet 5 within an internal space of the casing 2, the purification device 8, the air blowing device 6, and the air trunk 7 are arranged in order from an upstream side toward a downstream side.

In the description below, among side surfaces of the casing 2, a portion mainly arranged to face a space in the room is referred to as a front surface, and a portion opposed to the front surface is referred to as a rear surface. A direction which the front surface of the casing 2 faces is referred to as forward, a direction corresponding to left and right sides of the casing 2 when viewed from forward is referred to as a lateral direction, and further optionally, a vertical direction is referred to as an up-down direction. The air purifier 1 is provided on the floor in a position close to any wall in the room 100, and used with the rear surface of the casing 2 facing the wall surface and the front surface of casing 2 facing the space in the room.

The inlet 4 is an opening for sucking air in the room into the casing 2. The inlet 4 is provided, for example, in the front surface of the casing 2. The outlet 5 is an opening for blowing out air sucked into the casing 2. For example, two outlets 5 are formed in a top surface of the casing 2. The two outlets 5 extend parallel to each other laterally of the casing 2. In the description below, the air blown out of the outlet 5 is sometimes referred to as "blown-out air".

The inlet 4 may be placed in a back surface, the side surface, a bottom surface, or the like of the casing 2. The outlets 5 may be placed in the front surface, the side surface, or the like of the casing 2. Further, only one outlet 5 or three or more outlets 5 may be placed in the casing 2.

The air blowing device 6 sucks air from the inlet 4 into the casing 2 and blows the air out of the outlet 5. The air blowing device 6 includes a fan, and an electric motor for rotating the fan. As shown in FIG. 3, in the casing 2, for example, two air blowing devices 6 are vertically arranged to be shifted from each other in a front-rear direction.

In the casing, the air trunk 7 is provided. The air trunk 7 connects the air blowing device 6 and the outlet 5 and guides the air blown out of the air blowing device 6 to the outlet 5. The air trunk 7 is divided into a front air trunk 7 and a rear air trunk 7 by a partition 2A placed in the casing 2. The two air trunks 7 vertically extend in the casing 2, and arranged in parallel in the front-rear direction when viewed in a horizontal section.

Lower sides of the two air trunks 7 are connected to the different air blowing devices 6, respectively. Upper sides of the two air trunks 7 are connected to the two outlets 5, respectively. Specifically, the air purifier 1 includes a first air blowing channel extending from one air blowing device 6 via the air trunk 7 to the outlet 5, and a second air blowing channel extending from the other air blowing device 6 via the air trunk 7 to the outlet 5. The air blowing channels may separately control an amount, a direction, and a speed of air.

As such, the partition 2A is placed in the casing 2 to form the two air trunks 7 in parallel in the front-rear direction. At least one air blowing device 6 of the two air blowing devices 6 located on an upper side in FIG. 3 is constituted by an air blowing device having a built-in motor with a part of the motor being embedded in a fan. This may reduce footprint of the air purifier 1 while efficiently forming the two air blowing channels in the casing 2, thereby achieving a compact and high-performance air purifier 1.

The purification device 8 purifies air passing through the casing 2. The purification device 8 is provided, for example, between the inlet 4 and the air blowing device 6. "Purification" here means removal of contaminant containing, for example, dust, smoke, pollen, viruses, mold, bacteria, allergen, odor molecules, or the like suspended in air. Thus, "purification" specifically means an operation of collecting, deactivating, adsorbing, or decomposing the contaminant.

Here, as a device capable of such purification, for example, any of a dust collection filter for collecting dust in air, a deodorization filter for adsorbing an odor component, a voltage application device for applying a high voltage to an electrode to remove and decompose contaminant, or a combination thereof constitutes the purification device 8.

A dirt detection device 20 is provided on an upstream side of the purification device 8 in an air flow direction. The dirt detection device 20 detects an amount of contaminant sucked into the casing 2. The dirt detection device 20 is constituted, for example, by a dust sensor, a gas sensor, an air speed sensor, or the like, or a composite sensor with a combination of these sensors. The air purifier 1 blows out air in a particular direction, and the dirt detection device 20 may detect an amount of contaminant in air flowing back from this direction to detect a degree of dirt of the air in the particular direction.

FIGS. 4A and 4B are an enlarged view of essential portions in FIG. 2 showing operation states of the movable louver and the rectification mechanism. As shown in FIGS. 3 and 4, the movable louver 9 vertically swings a wind direction of blown-out air. One movable louver 9 is provided in each of the two outlets 5 in the casing 2. More specifically, the movable louver 9 is formed of, for example, an elongated plate or the like extending laterally of the casing 2. A base end of the movable louver 9 is mounted to each outlet 5 via the louver drive 10 provided in each outlet 5.

A front end of the movable louver 9 may be vertically oscillated by the louver drive 10. The two movable louvers 9 are configured to be able to individually change the wind direction of air blown out of the outlet 5. The case where the two movable louvers 9 are provided is here exemplified, but one movable louver 9 or three or more movable louvers 9 may be provided according to the number of the outlets 5.

The movable louver 9 vertically oscillates to vertically swing the wind direction of the blown-out air between forward and upward according to an oscillation angle. An elevation angle of the wind direction is changed to an angle substantially equal to an elevation angle of the movable louver 9. Herein, "elevation angle" means an angle of upward inclination with reference to a horizontal direction parallel to the floor. Specifically, the elevation angle=0° represents a horizontal direction, and the elevation angle=90° represents directly upward in a vertical direction.

The louver drive 10 includes a spindle for oscillatably supporting the movable louver 9, and an actuator (not shown) for rotating the spindle. The movable louver 9 and the louver drive 10 constitute a specific example of a wind direction variable mechanism capable of vertically changing the wind direction of the blown-out air.

As shown in FIG. 3, the opening variable mechanism 11 is provided, for example, in a position facing one movable louver 9 in the front-rear direction. The opening variable mechanism 11 cooperates with the movable louver 9 to change an opening area of the outlet 5. In FIGS. 2 and 4, the opening variable mechanism 11 is not shown for specifying the rectification mechanism 13 described later. FIG. 3 illustrates the opening variable mechanism 11 being placed only in one outlet 5, but not limited to this, the opening variable mechanism 11 may be placed only in the other outlet 5 or both the outlets 5.

The opening variable mechanism 11 is formed of, for example, an elongated plate or the like extending laterally of the casing 2. A base end of the opening variable mechanism 11 is mounted to the outlet 5 via the opening drive 12. The opening drive 12 has substantially the same configuration as the louver drive 10. A tip of the opening variable mechanism 11 is oscillated in the front-rear direction by the opening drive 12, and displaced close to and apart from the movable louver 9. Thus, the opening variable mechanism 11 may increase/decrease the opening area of the outlet 5, and change the speed of the blown-out air depending on the opening area. Specifically, the opening variable mechanism 11 and the opening drive 12 constitute a specific example of air blowing changing means capable of changing the speed of the blown-out air. The opening variable mechanism 11 may be placed in one or both of the air trunks 7 rather than the outlet 5, and serve as a mechanism for changing an opening area (that is, a flow path area) of the air trunk 7.

The rectification mechanism 13 laterally adjusts the wind direction while keeping the elevation angle of the wind direction set by the movable louver 9. As shown in FIGS. 3 and 4, the rectification mechanism 13 is formed of, for example, a substantially triangular (or sector) fin. A plurality of fins forming the rectification mechanism 13 are laterally arranged at intervals. The fins are provided to protrude from a wind receiving surface of each movable louver 9. As shown in FIGS. 4A and 4B, the individual rectification mechanism 13 laterally oscillates to laterally change the wind direction of the blown-out air depending on the oscillation angle.

An oscillating operation of the rectification mechanism 13 is performed by a rectification drive (not shown) provided, for example, in the movable louver 9. Specifically, the rectification mechanism 13 and the rectification drive constitute a specific example of a wind direction variable mechanism capable of laterally changing the wind direction of the blown-out air. It is not always necessary to provide the rectification mechanism 13. Only one rectification mechanism 13 may be placed, for example, on each of right and left ends of the movable louver 9.

As shown in FIGS. 2 and 3, the horizontal rotation mechanism 14 is provided between the casing 2 the base 3. The horizontal rotation mechanism 14 rotates the casing 2 on the base 3 at least laterally. Since the orientation of the outlet 5 horizontally changes with the casing 2, the horizontal rotation mechanism 14 constitutes a specific example of the wind direction variable mechanism capable of laterally changing the wind direction of the blown-out air. Similarly, since the orientation of the inlet 4 also horizontally changes with the casing 2, the horizontal rotation mechanism 14 constitutes a specific example of an inlet horizontal rotation mechanism for horizontally rotating the inlet 4.

As shown in FIGS. 2 and 4, a first sensor 21 is mounted to a front upper side of the casing 2. The first sensor 21 includes an infrared sensor 40 and a sensor operation unit 44. The infrared sensor 40 is a human detection sensor using infrared rays to detect a human. The sensor operation unit 44 is a sensor horizontal rotation mechanism for rotationally driving the orientation of the infrared sensor 40 in the horizontal direction (that is, opposite sides in the lateral direction) with respect to the casing 2.

Next, with reference to FIGS. 5 to 7, a configuration of the first sensor 21 will be described. FIG. 5 is a sectional view schematically showing a structure of the infrared sensor. FIG. 6 is a perspective view of an arrangement of light receiving elements that constitutes the infrared sensor and a detection range of each light receiving element. FIG. 7 illustrates rotating operations (a), (b) and (c) of the infrared sensor by the sensor operation unit.

As described above, the first sensor 21 includes the infrared sensor 40 and the sensor operation unit 44. The infrared sensor 40 detects infrared rays generated from an object to be detected. As shown in FIG. 5, the infrared sensor 40 includes a multielement light receiving unit 41 and a condenser lens 42. The multielement light receiving unit 41 is constituted by a plurality of light receiving elements 41a to 41h.

FIG. 5 illustrates the multielement light receiving unit 41 constituted by eight light receiving elements 41a to 41h. However, the number of the light receiving elements is not limited to eight, but the multielement light receiving unit 41 may be constituted by any number of light receiving elements less than seven or more than nine.

The light receiving elements 41a to 41h are detection elements capable of individually receiving infrared rays and detecting a human. The light receiving elements 41a to 41h are arranged, for example, vertically linearly. Thus, the infrared sensor 40 has a function of detecting a temperature in the room at eight separate areas with different heights. The condenser lens 42 efficiently collects infrared rays on the multielement light receiving unit 41. The condenser lens 42 is, for example, constituted by a convex lens. The infrared sensor 40 detects a temperature of the object to be detected using the individual light receiving elements 41a to 41h in a noncontact manner, and for example, outputs a signal corresponding to thermal imagery data in the room.

FIG. 6 is a perspective view of an arrangement of the light receiving elements of the infrared sensor and light distribution viewing angles. As shown in FIG. 6, light distribution viewing angles 43a to 43h of the light receiving elements 41a to 41h are set as rectangular areas having the same size. For the light distribution viewing angle 43a (which may be 43b to 43h) of one light receiving element 41a (41b to 41h), for example, a vertical light distribution viewing angle in the vertical direction is set to 7°, and a lateral light distribution viewing angle in the lateral direction is set to 8°.

The total light distribution viewing angle 43 including the light distribution viewing angles 43a to 43h is set as a vertically elongated area, and has a viewing angle upper limit 43 max as an upper limit of the light distribution viewing angle 43 and a viewing angle lower limit 43 min as a lower limit of the light distribution viewing angle 43. The light distribution viewing angles 43a to 43h do not always need to have the same shape and size, and specific values of the vertical light distribution viewing angle and the lateral light distribution viewing angle are not limited to those exemplified above.

The sensor operation unit 44 is configured to be able to rotate the orientation of the infrared sensor 40 horizontally to the casing 2. As the sensor operation unit 44, for example, a stepping motor is used capable of accurately adjusting a rotational driving angle of the infrared sensor 40. The stepping motor as the sensor operation unit 44 is configured to be controlled independently of the operation of the horizontal rotation mechanism 14 described above.

FIG. 7 illustrates rotating operations of the infrared sensor by the sensor operation unit, FIG. 7(a) shows the infrared sensor rotationally driven to a right end, FIG. 7(b) shows the infrared sensor rotationally driven to a center, and FIG. 7(c) shows the infrared sensor rotationally driven to a left end. As shown in FIG. 7, the first sensor 21 first rotationally drives an orientation (a detecting direction) of the infrared sensor 40 in the lateral direction using the sensor operation unit 44. More specifically, the orientation of the infrared sensor 40 is rotationally driven from the right end in FIG. 7(a) through the center in FIG. 7(b) to the left end in FIG. 7(c). If the infrared sensor reaches the left end in FIG. 7(c), the rotation direction is reversed, and the infrared sensor is returned from the left end in FIG. 7(c) through the center in FIG. 7(b) to the right end in FIG. 7(a). The first sensor 21 repeats such an operation to laterally scan a range of which temperature is to be detected in the room and sequentially detect the temperature.

With such a configuration of the first sensor 21, thermal imagery data may be compared over time within a lateral movable range of the infrared sensor 40, that is, within a first human detection range 301 shown in FIG. 1, thereby detecting a direction and a height of a human (that is, a position of the human) appearing in the space in the room 100. Also, positions of the human thus detected for respective detection times may be compared to detect changes over time in the position of the human, that is, movement of the human. Specifically, as described above, the first sensor 21 may detect the position of the human and the changes over time in the position of the human within the first human detection range 301 in the room 100.

With the first sensor 21, the eight light receiving elements 41a to 41h of the infrared sensor 40 capture thermal imagery data on areas of the respective light distribution viewing angles 43a to 43h, and thus a height of a human body may be detected with high accuracy according to which area of the light distribution viewing angle the presence of a human is detected in. In addition, the sensor operation unit 44 may be operated independently of the operation of the horizontal rotation mechanism 14, thereby allowing the lateral orientation of the infrared sensor 40 to be rotationally driven without influencing wind direction control.

Further, the first sensor 21 does not always need to be constituted by the infrared sensor 40, but may be constituted by any of a moving body sensor, a distance sensor, an illuminance sensor, a camera or the like, or a combination of any of these sensors and the infrared sensor 40 as long as the sensor may detect the direction and the height of the human in the room 100.

Here, the distance sensor is constituted by, for example, a non-contact sensor such as an ultrasonic sensor, an optical sensor, an image recognition sensor, or the like, and uses sound waves or electromagnetic waves to detect a distance between the air purifier 1 and an object to be detected. The object to be detected includes a wall, a ceiling, furniture, a human, an animal, or the like in the room. The illuminance sensor detects presence or absence, movement, or the like of a human and an animal in the room based on changes in illuminance. An output of the humidity sensor is used for correcting sensitivity of each of the above sensors according to humidity. The above combination of the sensors is merely an example, and is not limited.

A basic operation of the air purifier 1 configured as described above will be described. On actuation of the air purifier 1, first, the air blowing device 6 and the purification device 8 are driven. Thus, air is sucked from the inlet 4 into the casing 2, and purified by the purification device 8. Then, the purified air passes through each air blowing device 6 and each air trunk 7 to the outlet 5, and is blown out of the outlet 5. At this time, the air purifier 1 detects a position or the like of a human in the room 100 using the first sensor 21 to drive the movable louver 9, the opening variable mechanism 11, the rectification mechanism 13, the horizontal rotation mechanism 14, or the like so as to blow the blown-out air, for example, to an area above the head of the detected human.

Again with reference to FIG. 1, the description will be continued. The air purifier 1 configured as described above is provided on the floor in the room 100. The air conditioner 20 is provided, for example, on an upper position of the wall surface, that is, a position higher than the floor in the room 100. Thus, the air purifier 1 as the air blower and the air conditioner 200 as the sensor-mounted device are here placed in different positions in a height direction within the space in the room 100.

The air conditioner 200 is, for example, a well-known air conditioner. The second sensor 201 included in the air conditioner 200 has, for example, a configuration similar to that of the first sensor 21, and thus may detect a position of a human and changes over time in the position of the human within a second human detection range 302 in the room 100.

Next, with reference to FIG. 8, functional configurations of the air purifier 1 (air blower) and the air conditioner 200 (sensor-mounted device) included in the air blowing system according to this embodiment will be described. First, the air conditioner 200 includes, besides the second sensor 201 described above, a second information processing unit 202 and a transmission unit 203. In this embodiment, the air conditioner 200 further includes air blowing means 204 and a second main control unit 205 in addition to the above. The air blowing means 204 and the second main control unit 205 do not need to be always provided in this invention.

The air blowing means 204 feeds air conditioned by the air conditioner 200 back into the room 100. The air blowing means 204 specifically includes a well-known air blowing fan and a wind direction variable mechanism, or the like.

The second information processing unit 202 performs various information processings required for the operation of the air conditioner 200. Specifically, for example, the second information processing unit 202 processes a detection result of the second sensor 201 into a data format suitable for control by the second main control unit 205 described below, transmission from the transmission unit 203 described later, and the like.

The second main control unit 205 controls the operation of the air conditioner 200 based on information or the like processed by the second information processing unit 202. Specifically, the second main control unit 205 controls the operation of the air blowing means 204 based on the detection result of the second sensor 201 or the like processed by the second information processing unit 202. Specifically, the second main control unit 205 constitutes a second controller for controlling the air blowing means 204 based on the detection result of the second sensor 201. The second main control unit 205 also controls the operation of the second sensor 201.

Here, the second information processing unit 202 also processes information on a control state of the air blowing means 204 by the second main control unit 205 into a format suitable for transmission from the transmission unit 203 described next. The information on the control state of the air blowing means 204 includes, for example, an amount of air, a wind direction, an air conditioning situation (cooling, heating, etc.), or the like of the air blowing means 204.

The transmission unit 203 is a transmitter for transmitting the information processed by the second information processing unit 202 to outside of the air conditioner 200 by a predetermined communication method. As the communication method, various well-known wireless and wired methods may be used. For example, with a wireless method, the transmission unit 203 may be configured using infrared communication for a remote controller without providing a dedicated transmitter. In both of the wireless and wired methods, LAN (Local Area Network) or PAN (Personal Area Network) may be used.

The transmission unit 203 specifically transmits the information on the detection result of the second sensor 201 processed by the second information processing unit 202. Here, the transmission unit 203 also transmits the information on the control state of the air blowing means 204 by the second main control unit 205 processed by the second information processing unit 202.

Next, the air purifier 1 as the air blower further includes a receiving unit 51, an operation unit 52, a time obtaining unit 53, a first main control unit 54, a storage unit 55, and a first information processing unit 60 in addition to the air blowing device 6, the louver drive 10, the first sensor 21, or the like described above. The receiving unit 51 is a receiver for receiving the information transmitted form the transmission unit 203 as the transmitter. Specifically, the receiving unit 51 is configured to be able to receive the information transmitted from the transmission unit 203 by the predetermined communication method.

The operation unit 52 is operated when a user of the air purifier 1 switches various settings and operations. The operation unit 52 includes, for example, a power switch for activating and deactivating the air purifier 1, a mode switch for designating an operation mode or the like of the air purifier 1. The operation unit 52 is provided, for example, on a top surface or a front surface of the casing 2 of the air purifier 1 so as to be easily operated by the user. Alternatively, the operation unit 52 may be constituted by a mobile terminal (for example, a smart phone) or the like possessed by the user.

The time obtaining unit 53 obtains the present time from a built-in clock constituted by, for example, a timing device. The first information processing unit 60 performs various information processings required for the operation of the air conditioner 200. Also with reference to FIG. 9, the description will be continued for specific description on the information processing by the first information processing unit 60. FIG. 9 shows a configuration of the first information processing unit 60. As shown in FIG. 9, the first information processing unit 60 includes a human detection unit 61, a different sensor position grasping unit 63, a sensor information integration unit 64, and an environmental information obtaining unit 62. Here, the first information processing unit 60 further includes a different device air blowing state obtaining unit 65.

The human detection unit 61 detects presence or absence, a position, and movement of a human within the first human detection range 301 in the room 100 based on the detection result of the first sensor 21. The human detection unit 61 also detects presence or absence, a position, and movement of a human within the second human detection range 302 in the room 100 based on the detection result of the second sensor 201 received by the receiving unit 51.

The environmental information obtaining unit 62 obtains information on the room 100, that is, the space provided with the air purifier 1 based on the detection result of the first sensor 21 and the detection result of the second sensor 201 received by the receiving unit 51. The information on the room 100 (the space provided with the air purifier 1) is specifically information on, for example, a size and a layout of the room 100, and positional relationships between the air purifier 1 and the wall of the room 100, the window 101, and the furniture 102, or the like. The information on the room 100 (the space provided with the air purifier 1) may include information on an environmental state in the room 100 detected by a sensor other than the first sensor 21 or the second sensor 201 provided in the air purifier 1 or the sensor-mounted device (air conditioner 200). The information on the environmental state in the room 100 is, specifically for example, information on dust, pollen, an amount of bacteria, odor, temperature and humidity, illuminance, sound, or the like in the room 100.

As described above, the first sensor 21 and the second sensor 201 are constituted by, for example, infrared sensors. The infrared sensor may detect a surface temperature of an object in a noncontact manner. Then, from detected surface temperature distribution, information on presence or absence of the window 101, a position of the wall, a size of the room 100, or presence or absence and a layout of the furniture 102, or the like may be obtained. The environmental information obtaining unit 62 may use information integrated by the sensor information integration unit 64 described later to obtain environmental information (information on a space provided with the air purifier 1).

The different sensor position grasping unit 63 grasps a position of a sensor different from that in the air purifier 1, that is, a sensor other than the first sensor 21. The sensor other than the first sensor 21 is here the second sensor 201. The different sensor position grasping unit 63 grasps a relative position of the second sensor 201 as the different sensor with respect to the first sensor 21.

There are two main methods for the different sensor position grasping unit 63 to grasp the position of the different sensor (second sensor 201). The first method is such that the user manually inputs positional information of the different sensor, and the different sensor position grasping unit 63 grasps the position of the different sensor (second sensor 201) based on the input positional information.

When using the first method, the user operates, for example, the operation unit 52 to input information on the position of the different sensor (second sensor 201) with respect to the position of the air purifier 1 (first sensor 21). As the positional information of the different sensor (second sensor 201) in this case, for example, a direction and a distance of the different sensor (second sensor 201, air conditioner 200) from the air purifier 1 (first sensor 21) may be used. Then, based on the positional information input from the operation unit 52, the different sensor position grasping unit 63 may grasp the position of the different sensor (second sensor 201) with respect to the position of the air purifier 1 (first sensor 21).

The second method for the different sensor position grasping unit 63 to grasp the position of the different sensor (second sensor 201) is such that the different sensor position grasping unit 63 automatically grasps the position of the different sensor (second sensor 201) based on the detection result of the first sensor 21 and the detection result of the second sensor 201.

The method for the different sensor position grasping unit 63 to grasp the position of the different sensor (second sensor 201) based on the detection result of the first sensor 21 and the detection result of the second sensor 201 will be described with a specific example. First, an example arrangement in FIG. 1 will be described. In the example arrangement in FIG. 1, the first human detection range 301 and the second human detection range 302 partially overlap. Thus, the first sensor 21 or the second sensor 201 may mainly detect three types of humans including a human 401 within the first human detection range, a human 402 within the second human detection range, and a human 403 within both the human detection ranges.

The different sensor position grasping unit 63 particularly notes movement of the human 403 within both the human detection ranges among the three types of humans to grasp a relative positional relationship between the first sensor 21 and the second sensor 201. Specifically, the different sensor position grasping unit 63 presumes the relative positional relationship between the first sensor 21 and the second sensor 201 based on information on which direction the human 403 within both the human detection ranges seems to move in from each of the first sensor 21 and the second sensor 201.

Whether or not the human detected by the first sensor 21 and the human detected by the second sensor 201 are the same human, that is, the human 403 within both the human detection ranges may be determined whether or not the human detected by the first sensor 21 and the human detected by the second sensor 201 simultaneously move. In this case, whether or not the humans simultaneously move is determined with reference to the present time obtained by the time obtaining unit 53.

As such, when the first sensor 21 detects the human, the second sensor 201 also detects the human, and the two sensors simultaneously detect movement of the detected humans, the different sensor position grasping unit 63 determines that the humans detected by the two sensors are the same human 403 within both the human detection ranges.

FIGS. 10 and 11 show an example of the detection results of the first sensor 21 and the second sensor 201 when the human 403 within both the human detection ranges moves in the example arrangement in FIG. 1. FIG. 10 shows the movement of the human 403 within both the human detection ranges detected by the first sensor 21. FIG. 11 shows the movement the human 403 within both the human detection ranges detected by the second sensor 201.

In this example, as shown in FIG. 10, the human 403 within both the human detection ranges detected by the first sensor 21 moves left in FIG. 10. A size of the human 403 within both the human detection ranges detected by the first sensor 21 does not change. Thus, it may be presumed that the human 403 within both the human detection ranges moves left when viewed from the first sensor 21.

Also, in this example, as shown in FIG. 11, for the human 403 within both the human detection ranges detected by the second sensor 201, the detected position changes little and the detected size increases. Thus, it may be presumed that the human 403 within both the human detection ranges moves in a direction approaching the second sensor 201.

If the detection results of the two sensors are from detection of the same movement of the same human, it is found that the second sensor 201 is on the left of the first sensor 21. Also, from the size of the human detected by each sensor, a distance from each sensor to the human may be presumed. Then, based on the distance from each sensor to the human and the direction of the other sensor with respect to one sensor, a distance between the first sensor 21 and the second sensor 201 may be obtained. As such, the different sensor position grasping unit 63 may grasp a relative position of the different sensor (second sensor 201) with respect to the air purifier 1 or the first sensor 21.

Next, an example arrangement shown in FIG. 12 will be described. Also in the example arrangement in FIG. 12, the first human detection range 301 and the second human detection range 302 partially overlap. Then, the different sensor position grasping unit 63 particularly notes a positional relationship of the human 403 within both the human detection ranges among the three types of humans and a positional reference object in the room 100 to grasp a relative positional relationship between the first sensor 21 and the second sensor 201.

The determination whether or not the human detected by the first sensor 21 and the human detected by the second sensor 201 are the same human, that is, the human 403 within both the human detection ranges is similar to that in the example arrangement in FIG. 1 described above.

FIGS. 13 and 14 show an example of the detection results of the first sensor 21 and the second sensor 201 in the example arrangement in FIG. 12. FIG. 13 shows the human 403 within both the human detection ranges and the window 101 detected by the first sensor 21. FIG. 14 shows the human 403 within both the human detection ranges and the window 101 detected by the second sensor 201.

In this example, as shown in FIG. 13, the human 403 within both the human detection ranges detected by the first sensor 21 is located on the left of the window 101 in FIG. 13. On the other hand, as shown in FIG. 14, the human 403 within both the human detection ranges detected by the second sensor 201 is located on the right of the window 101 in FIG. 14.

If the detection results of the two sensors are from detection of the same human 403 within both the human detection ranges and the same window 101, it is found that the first sensor 21 and the second sensor 201 are located to face the human 403 within both the human detection ranges from opposite sides. Also, from the size of the human detected by each sensor, a distance from each sensor to the human may be presumed. Thus, the different sensor position grasping unit 63 may grasp a relative position of the different sensor (second sensor 201) with respect to the first sensor 21.

The sensor information integration unit 64 uses the relative position of the second sensor 201 grasped by the different sensor position grasping unit 63 to integrate the detection result of the first sensor 21 and the detection result of the second sensor 201 received by the receiving unit 51. Then, the sensor information integration unit 64 obtains the position of the human and changes over time in the position of the human with respect to the first sensor 21 based on the integrated detection result.

The position or the like of the human detected by the first sensor 21 is with respect to the position of the first sensor 21. Similarly, the position or the like of the human detected by the second sensor 201 is with respect to the position of the second sensor 201. The sensor information integration unit 64 uses the relative position of the second sensor 201 with respect to the first sensor 21 grasped by the different sensor position grasping unit 63 to convert the detection result of the second sensor 201 with respect to the position of the second sensor 201 into the detection result with respect to the position of the first sensor 21. Then, the converted detection result of the second sensor 201 and the detection result of the first sensor 21 are integrated. The integrated detection result is with respect to the position of the first sensor 21. The sensor information integration unit 64 obtains the position of the human and the changes over time in the position of the human with respect to the first sensor 21 based on the integrated detection result.

The different device air blowing state obtaining unit 65 obtains information on a control state of the air blowing means 204 by the second main control unit 205 as a second controller from the information received by the receiving unit 51.

The first main control unit 54 controls the operation of the air purifier 1 using the information processed by the first information processing unit 60 as described above. Specifically, first, the first main control unit 54 performs air blowing control of the air purifier 1 based on the detection result of the human detection unit 61 in the first information processing unit 60. Specifically, the first main control unit 54 constitutes a first controller for performing the air blowing control of the air purifier 1 as the air blower based on the detection result of the first sensor 21 and the detection result of the second sensor 201 received by the receiving unit 51.

As such, the air blowing control of the air purifier 1 may use the detection result of the first sensor 21 included in the air purifier 1 and also the detection result of the second sensor 201 provided in a position different from that of the first sensor 21 in the room 100. This may reduce a region where the air purifier 1 cannot recognize a human in the room 100 provided with the air purifier 1, and achieve control of the air purifier 1 with a consideration for a human within a wider range in the room 100.

Specifically for example, the air purifier 1 may recognize presence of the human 402 within the second human detection range outside of the first human detection range 301, and may blow air from the air purifier 1 to outside of the first human detection range 301. Specifically, when the first sensor 21 does not detect the human within the first human detection range 301 as the detection result of the first sensor 21, and the second sensor 201 detects the human within the second human detection range 302 as the detection result of the second sensor 201 received by the receiving unit 51, the first main control unit 54 as the first controller may perform air blowing control so as to change a direction of outlet air of the air purifier 1 as the air blower to outside of the first human detection range 301.

The air blowing control here is control to change any one or more of a direction, an amount, and a speed of supply air, and a direction, an amount, a speed of outlet air, temperature and humidity, and a degree of purification of the air purifier 1. The direction of the supply air may be changed, for example, by the horizontal rotation mechanism 14 changing an orientation of the casing 2 itself and changing an orientation of the inlet 4. The amount and the speed of the supply air may be changed, for example, by changing a rotation speed of the air blowing device 6.

The direction of the outlet air may be changed, for example, by the horizontal rotation mechanism 14 changing the orientation of the casing 2 itself and changing the orientation of the outlet 5. The direction of the outlet air may be also changed by moving the movable louver 9 via the louver drive 10 or moving the rectification mechanism 13 via the rectification drive.

The amount and the speed of the outlet air may be changed, for example, by changing the rotation speed of the air blowing device 6. Alternatively, the amount and the speed of the outlet air may be also changed by moving the opening variable mechanism 11 via the opening drive 12. When, for example, a voltage application device is used as the purification device 8, the degree of purification of the outlet air may be changed by changing a state of energization to the voltage application device.

Although the temperature and humidity of the outlet air are not particularly changed in the air purifier 1 described here, the air blower may include, for example, such an air conditioning function as of the air conditioner 200, thereby changing the temperature and humidity of the outlet air in the air blower.

The first main control unit 54 may perform the air blowing control based on the position of the human or the changes over time in the position of the human with respect to the first sensor 21 obtained by the sensor information integration unit 64 of the first information processing unit 60. As such, the air purifier 1 may recognize presence or absence of the human outside of the first human detection range 301, and also the position and the movement of the human 402 within the second human detection range outside of the first human detection range 301. This allows more appropriate air blowing from the air purifier 1 depending on the position and the movement of the human 402 within the second human detection range.

Moreover, the air blowing control may be performed further using the control state of the air blowing means 204 obtained by the different device air blowing state obtaining unit 65 of the first information processing unit 60, that is, the control state of the air blowing means 204 received by the receiving unit 51. As such, air blowing from the air purifier 1 may be controlled so as to avoid interference between air blowing from the air conditioner 200 and air blowing from the air purifier 1 and allow complementary cooperation between the air purifier 1 and the air conditioner 200. Also, an airflow may be appropriately controlled such as by reducing turbulence in the room 100 to provide a more comfort environment for the human in the room 100.

In addition, the first main control unit 54 may perform the air blowing control further using the information on the space in the room 100 obtained by the environmental information obtaining unit 62 of the first information processing unit 60. The airflow in the room 100 is influenced not only by the human in the room 100 but also by the environment such as the size of the room 100 and the layout of the wall, the window 101, and the furniture 102 and the like in the room 100. Thus, further using the information on the space in the room 100 obtained by the environmental information obtaining unit 62, more appropriate control of the air purifier 1 may be performed with a consideration for the environment in the room 100 to provide a comfort space for the human.

The storage unit 55 stores an information processing result of the first information processing unit 60, the control state by the first main control unit 54, or the like. The information processing result of the first information processing unit 60 includes, specifically for example, information on the position of the human or the changes over time in the position of the human with respect to the first sensor 21 obtained by the sensor information integration unit 64, information on the control state of the air blowing means 204 obtained by the different device air blowing state obtaining unit 65, and information on the space in the room 100 obtained by the environmental information obtaining unit 62.

Next, with reference to a flowchart in FIG. 15, a flow of the operation of the air blowing system configured as described above will be described with the air purifier 1 as the air blower performing the operation. First in step S1, the air purifier 1 is turned on to start the operation, and then the process moves to step S2. In step S2, the air purifier 1 initializes operation information stored in the storage unit 55.

In subsequent step S3, the first main control unit 54 operates the first sensor 21 to detect a human within the first human detection range 301. Then, the process moves to step S4, and the first information processing unit 60 obtains information on the detection result of the second sensor 201 received by the receiving unit 51. After the step S4, the process moves to step S5.

In step S5, the first main control unit 54 confirms whether or not presence of a human is detected within at least either the first human detection range 301 or the second human detection range 302 based on the detection result of the human detection unit 61. Specifically, it is confirmed whether or not at least either the first sensor 21 or the second sensor 201 detects a human.

If neither the first sensor 21 nor the second sensor 201 detects a human, the first main control unit 54 determines that there is no human in the room 100. Then, in this case, the process moves to step S6, and the first main control unit 54 performs the air blowing control for the case where there is no human in the room 100. After step S6, the process returns to step S2.

On the other hand, if at least either the first sensor 21 or the second sensor 201 detects a human in step S5, the process moves to step S7. In step S7, the first main control unit 54 confirms whether or not the second sensor 201 detects presence of a human within the second human detection range 302 based on the detection result of the human detection unit 61.

If the second sensor 201 does not detect a human, there is a human within the first human detection range 301. Then, the process moves to step S8, and the first main control unit 54 performs the air blowing control for the case where the first sensor 21 detects presence of a human within the first human detection range 301. After step S8, the process returns to step S2.

On the other hand, if the second sensor 201 detects a human in step S7, the process moves to step S9. In step S9, information on the positional relationship of the second sensor 201 with respect to the first sensor 21 is obtained which is grasped by the different sensor position grasping unit 63. Then in subsequent step S10, the first main control unit 54 confirms whether or not the first sensor 21 detects presence of a human within the first human detection range 301 based on the detection result of the human detection unit 61.

If the first sensor 21 does not detect a human, there is a human within the second human detection range 302. Then, the process moves to step S11, and the first main control unit 54 performs the air blowing control for the case where the second sensor 201 detects presence of a human within the second human detection range 302. After step S11, the process returns to step S2.

On the other hand, if the first sensor 21 detects a human in step S10, the process moves to step S12. In step S12, if the human detected by the first sensor 21 and the human detected by the second sensor 201 are the same human, that is, there is a human determined to be the human 403 within both the human detection ranges, the different sensor position grasping unit 63 obtains information on the human.

Then, the process moves to step S13, and the first main control unit 54 performs the air blowing control for the case where both the first sensor 21 and the second sensor 201 detect the human 403 within both the human detection ranges. After step S13, the process returns to step S2.

The case has been described where there is only one sensor-mounted device other than the air purifier 1 as the air blower, that is, the air conditioner 200 including the second sensor 201. However, the number of the sensor-mounted devices is not limited to one. Specifically, the air blowing system may include two or more sensor-mounted devices, for example, include a third sensor, a fourth sensor, or the like. In this case, for example, the different sensor position grasping unit 63 grasps the position of the second sensor 201, and also all positions of different sensors such as the third sensor. The sensor information integration unit 64 integrates detection results of all the sensors. With a larger number of available sensors, more advantageous effects may be obtained for increasing the human detection range and reducing blind spots of the sensor.

The air blowing system may include an external calculator communicably connected to the air purifier 1 as the air blower and the air conditioner 200 as the sensor-mounted device. As the external calculator, specifically for example, a central controller for controlling various household electric devices, HEMS (Home Energy Management System), or the like may be used.

The external calculator may have part or all of the function of the first information processing unit 60 and the function of the storage unit 55. In this case, the receiving unit 51 of the air purifier 1 receives information on the information processing result of the first information processing unit 60 from the external calculator. Then, the first main control unit 54 of the air purifier 1 controls the operation of the air purifier 1 based on the information, etc. on the information processing result of the first information processing unit 60 received by the receiving unit 51.

As described above, the sensor-mounted device may not always include the air blowing means 204, and may not be the air conditioner 200. A different electric device provided in the room 100 may be used as the sensor-mounted device, and for example, a television or the like may be used as the sensor-mounted device. Also, the sensor-mounted device may be a device only for providing the second sensor 201 in the room 100.

On the other hand, if the sensor-mounted device is the air conditioner 200, the air conditioner 200 is generally often provided in a relatively high position in the room 100, and thus the first sensor 21 and the second sensor 201 may be placed in different height positions, thereby reducing blind spots of the sensor to expect a further advantage.

Embodiment 2

Figure 16:
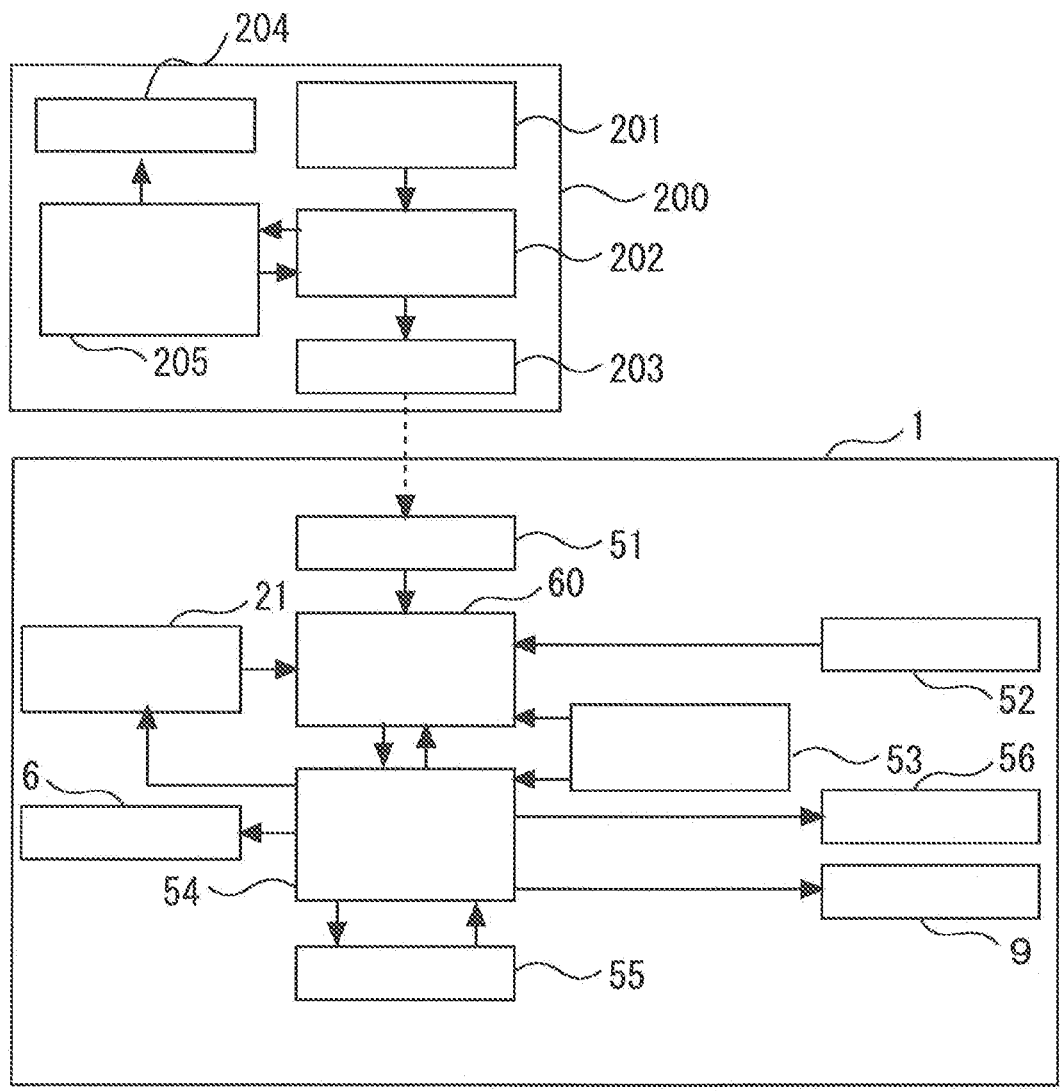
FIG. 16 is a block diagram of a functional configuration of an air blowing system including an air blower according to Embodiment 2 of the present invention.

FIG. 16 is a block diagram of a functional configuration of an air blowing system according to Embodiment 2 of the present invention.

Embodiment 2 described here further includes, in addition to the configuration in Embodiment 1 described above, a display unit capable of displaying the detection result of the first sensor, the detection result of the second sensor received by the receiving unit, or the like.

Specifically, as shown in FIG. 16, the air purifier 1 includes a display unit 56. The display unit 56 is provided, for example, on an upper surface or a front surface of the casing 2 of the air purifier 1 so as to be easily visually identified by a user. The display unit 56 is constituted by, for example, a liquid crystal display (LCD) or the like. Alternatively, the display unit 56 may be constituted by a mobile terminal (for example, a smart phone) or the like possessed by the user.

Contents displayed on the display unit 56 are controlled by the first main control unit 54. The contents displayed on the display unit 56 are information on the information processing result of the first information processing unit 60, the information stored in the storage unit 55, or the like. Specifically for example, the display unit 56 displays the detection result of the human detection unit 61 of the first information processing unit 60. Specifically, the display unit 56 displays the detection result of the first sensor 21 and the detection result of the second sensor 201 received by the receiving unit 51.

The display unit 56 may display a position of a human or changes over time in the position of the human with respect to the first sensor 21 obtained by the sensor information integration unit 64 of the first information processing unit 60. Further, the display unit 56 may display a control state of the air blowing means 204 obtained by the different device air blowing state obtaining unit 65 of the first information processing unit 60, that is, a control state of the air blowing means 204 received by the receiving unit 51. In addition, the display unit 56 may display information on a space in the room 100 obtained by the environmental information obtaining unit 62 of the first information processing unit 60.

Alternatively, the display unit 56 may display a situation of the air blowing control by the first main control unit 54. Further, the display unit 56 may display these pieces of information in an appropriately combined manner.

Other configurations are similar to those in Embodiment 1, and detailed descriptions thereof will be omitted.

With the air blowing system configured as described above, an advantage similar to that of Embodiment 1 may be obtained, and also the user may easily find the detection results of both the first sensor 21 and the second sensor 201. Also, the user may grasp that the air purifier 1 recognizes not only the detection result of the first sensor 21 but also the detection result of the second sensor 201.

Embodiment 3

Figure 17:
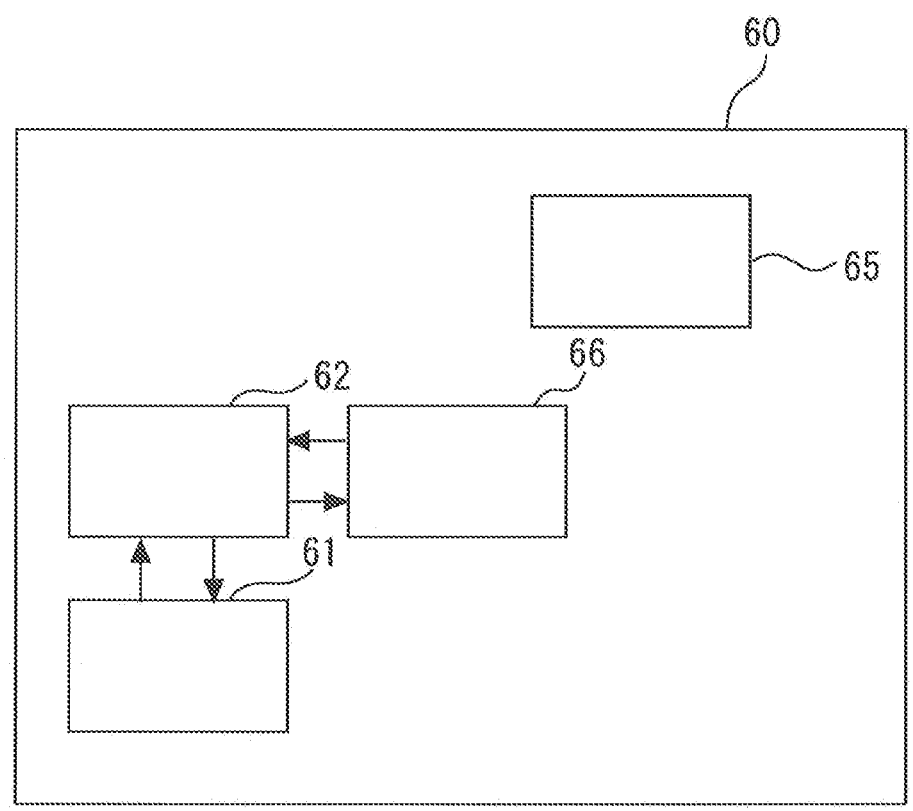
FIG. 17 is a block diagram of an internal configuration of a first information processing unit included in an air blowing system including an air blower according to Embodiment 3 of the present invention.

FIG. 17 is a block diagram of an internal configuration of a first information processing unit included in an air blowing system according to Embodiment 3 of the present invention.

In Embodiments 1 and 2 described above, like the first sensor 21, the second sensor 201 detects the position of the human and the changes over time in the position of the human within the predetermined human detection range. The second sensor 201 is constituted by, specifically for example, an infrared sensor, a moving body sensor, a distance sensor, an illuminance sensor, a camera, or the like.

On the other hand, in Embodiment 3 described here, the second sensor 201 does not directly detect a position of a human or the like, but detects a physical amount which changes depending on presence or absence of a human to indirectly detect presence of the human.

In Embodiment 3, a functional configuration of the air blowing system is basically the same as in Embodiment 1 in FIG. 8 or Embodiment 2 in FIG. 16. However, unlike in Embodiments 1 and 2, the second sensor 201 detects a physical amount which changes depending on presence or absence of a human in the room 100, that is, a space provided with the air purifier 1 as the air blower and the air conditioner 200 as the sensor-mounted device.

The physical amount which changes depending on presence or absence of a human in the room 100 includes, specifically for example, door opening/closing sound of the room 100, footsteps in the room 100, cooking sound in the room 100, operation sound of a different air conditioner provided in the room 100, changes in illuminance in the room 100 due to an operation state of a light fixture in the room 100 or opening/closing of a curtain or the like, atmospheric pressure variations due to opening/closing of a door in the room 100, changes in power consumption in the room due to operation of a device provided in the room 100, or the like.

To detect the physical amounts, as the second sensor 201, specifically for example, an acoustic sensor, an illuminance sensor, a pressure sensor, a power consumption sensor, or the like may be used. If the acoustic sensor, that is, a microphone is used as the second sensor 201, the second sensor 201 may detect, for example, door opening/closing sound, cooking sound, operation sound of the air conditioner, cleaning sound, or the like. If the illuminance sensor is used as the second sensor 201, the second sensor 201 may detect, for example, changes in illuminance or the like in the room 100 due to opening/closing of a curtain or turning on/off a light in the room 100 or the like. If the pressure sensor is used as the second sensor 201, for example, atmospheric pressure variations in the room 100 due to opening/closing of the door in the room 100 may be detected, and if the power consumption sensor is used, for example, variations in power consumption due to changes in the operation state of home appliances in the room 100 may be detected. Then, based on the detected physical amounts, presence or absence of a human in the room 100 may be presumed.

The detection result of the second sensor 201 is processed into a data format suitable for transmission from the transmission unit 203 by the second information processing unit 202. Then, the information on the detection result of the second sensor 201 processed by the second information processing unit 202 is transmitted by the transmission unit 203.

The receiving unit 51 included in the air purifier 1 as the air blower is a receiver for receiving the information transmitted from the transmission unit 203 as a transmitter. Specifically, the receiving unit 51 may receive the information on the detection result of the second sensor 201 transmitted from the transmission unit 203 by the predetermined communication method described above.

In Embodiment 3, the first information processing unit 60 is configured as shown in FIG. 17. As shown in FIG. 17, the first information processing unit 60 includes a human detection unit 61, an environmental information obtaining unit 62, and a human presence detection unit 66. The first information processing unit 60 may further include a different device air blowing state obtaining unit 65.

The human detection unit 61 detects presence or absence, a position, and movement of a human within the first human detection range 301 in the room 100 based on the detection result of the first sensor 21. The human presence detection unit 66 is human presence detection means for detecting presence or absence of a human in the room 100 based on the detection result of the second sensor 201 received by the receiving unit 51 as the receiver. As described above, the second sensor 201 detects a physical amount which changes depending on presence or absence of a human in the room 100. The human presence detection unit 66 detects presence or absence of a human in the room 100 from changes in the physical amount contained in the detection result of the second sensor 201. The environmental information obtaining unit 62 and the different device air blowing state obtaining unit 65 have functions similar to those in Embodiment 1 or 2.

The first main control unit 54 uses the information processed by the first information processing unit 60 as described above to control the operation of the air purifier 1. Specifically, the first main control unit 54 performs air blowing control of the air purifier 1 based on the detection result of the human detection unit 61 and the detection result of the human presence detection unit 66. Specifically, the first main control unit 54 constitutes a controller for performing the air blowing control of the air purifier 1 as the air blower based on the detection result of the first sensor 21 and the detection result of the second sensor 201 received by the receiving unit 51.

As such, the air blowing control of the air purifier 1 may use not only the detection result of the first sensor 21 included in the air purifier 1 but also the information on presence or absence of the human presumed based on the detection result of the second sensor 201. Thus, like Embodiment 1 described above, a region where the air purifier 1 cannot recognize a human in the room 100 provided with the air purifier 1 may be reduced, and the control of the air purifier 1 may be achieved with a consideration for a human within a wider range in the room 100.

The air blowing control here is control to change any one or more of a direction, an amount, and a speed of supply air, and a direction, an amount, and a speed of outlet air, temperature and humidity, and a degree of purification of the air purifier 1.

The first main control unit 54 as the controller may perform, when the first sensor 21 does not detect a human within the first human detection range 301 and the human presence detection unit 66 detects presence of a human in the room 100, the air blowing control so as to change the direction of the outlet air of the air purifier 1 to outside of the first human detection range 301. Further in this case, the outlet air of the air purifier 1 is directed to a region other than the first human detection range 301 within the entire region in the room 100, and thus purified air may be fed to a human presumed to be outside of the first human detection range 301 in the room 100. This allows the air blowing control for the entire region of the room 100.

Other configurations are similar to those in Embodiment 1 or 2, and detailed descriptions thereof will be omitted.

The human presence detection unit 66 may presume presence or absence of a human in the room 100 using not only the detection result of the second sensor 201 but also the environmental information obtained by the environmental information obtaining unit 62, that is, information on presence or absence of the window 101 in the room 100, a position of the wall, a size of the room 100, presence or absence and a layout of the furniture 102, or the like. As such, for example, presumption accuracy of presence or absence of a human may be improved with a consideration for an influence of sound echo in the room 100, an influence of the layout of the window 101 and the furniture 102 on the illuminance and the like. Also, information on types of home appliances provided in the room 100 may be obtained and used for presuming presence or absence of a human.

In this case, one or both of the environmental information and the information on the types of home appliances may be previously stored in a personal computer (PC) or a cloud server or the like (not shown). The air purifier 1 may be communicably connected to the PC or the cloud server, and obtain one or both of the environmental information and the information on the types of home appliances from the PC or the cloud server for use in the human presence detection unit 66. In this case, a dedicated terminal may be provided for inputting the environmental information and the information on the types of home appliances to the PC or the cloud server.

Embodiment 4

Figure 18:
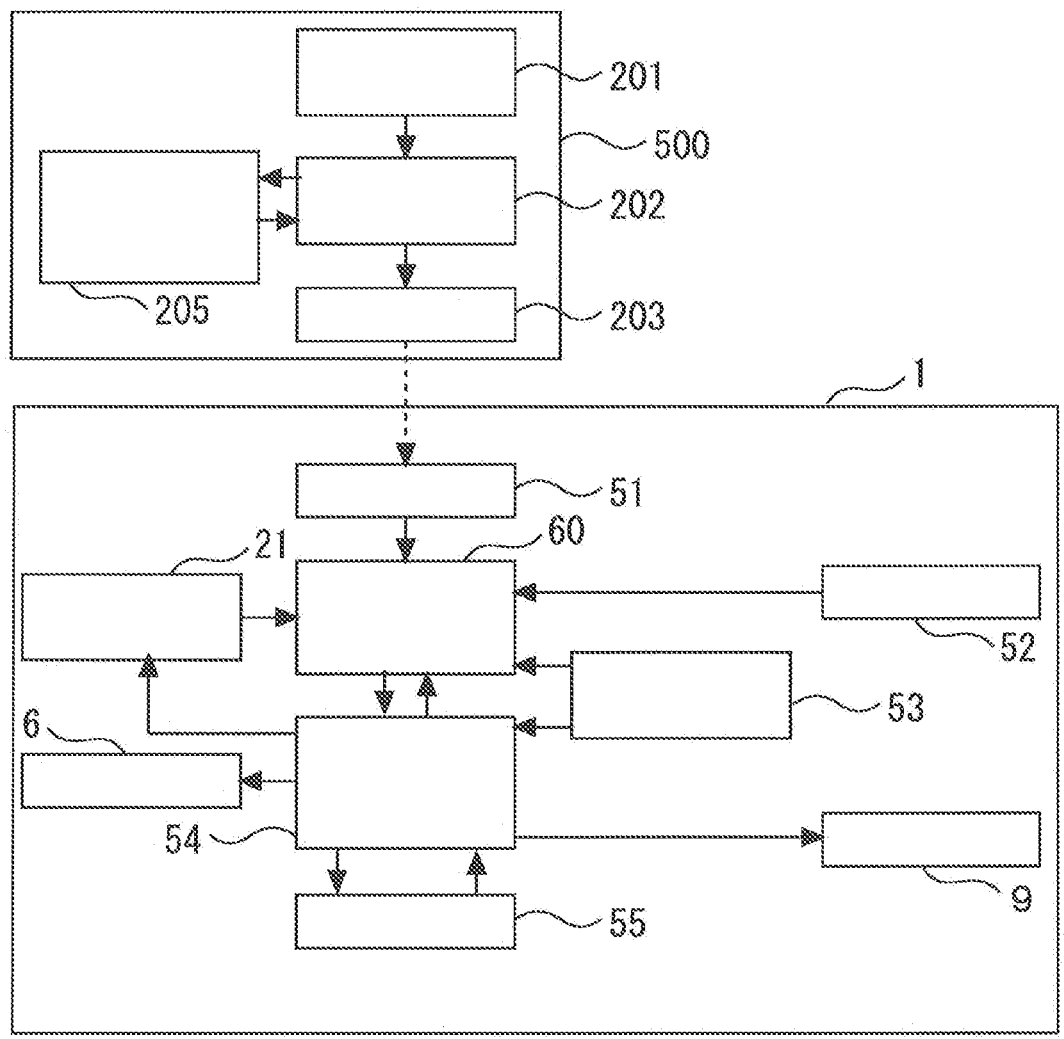
FIG. 18 is a block diagram of a functional configuration of an air blowing system including an air blower according to Embodiment 4 of the present invention.

FIG. 18 is a block diagram of a functional configuration of an air blowing system according to Embodiment 4 of the present invention.

In Embodiments 1 to 3 described above, for example, the air conditioner 200 as the sensor-mounted device is provided in a predetermined position in the room 100. On the other hand, in Embodiment 4 described here, the sensor-mounted device is portable, and a human in the room 100 carries the sensor-mounted device.

Specifically, as shown in FIG. 18, in Embodiment 4, a mobile device 500 is provided as the sensor-mounted device. The mobile device 500 is portable. The mobile device 500 is carried by a human in a space provided with the air purifier 1 as the air blower, that is, in the room 100. The mobile device 500 includes, specifically for example, a mobile phone, a smart phone, a wristwatch (also including a wristwatch type mobile terminal device), or the like.

The mobile device 500 includes a second sensor 201. The second sensor 201 detects a position of the mobile device 500 and changes over time in the position of the mobile device 500 in the room 100. As such a second sensor 201, specifically for example, a vibration sensor, an accelerator sensor, a GPS (Global Positioning System), or the like may be used.

The detection result of the second sensor 201 is processed into a data format suitable for transmission from the transmission unit 203 by the second information processing unit 202. Then, the information on the detection result of the second sensor 201 processed by the second information processing unit 202 is transmitted by the transmission unit 203.

The receiving unit 51 included in the air purifier 1 as the air blower is a receiver for receiving the information transmitted from the transmission unit 203 as a transmitter. Specifically, the receiving unit 51 may receive the information on the detection result of the second sensor 201 transmitted from the transmission unit 203 by the predetermined communication method described above.

The communication method used in this case is preferably a method that allows communication only within the room 100 and does not allow communication between inside and outside of the room 100. As such, if the air purifier 1 in the room 100 cannot receive the information from the transmission unit 203, it may be determined that the human carrying the mobile device 500 is not within the room 100. If the human carrying the mobile device 500 returns into the room 100, the air purifier 1 may receive the information from the transmission unit 203. Such a communication method includes, for example, a communication using infrared rays blocked by a wall or the like of the room 100, or a short-distance radio communication using a band of 2.4 GHz, or the like.

The human detection unit 61 of the first information processing unit 60 detects presence or absence, a position, and movement of a human within the first human detection range 301 in the room 100 based on the detection result of the first sensor 21. The human detection unit 61 also detects presence or absence, a position, and movement of a human in the room 100 based on the detection result of the second sensor 201 received by the receiving unit 51. Specifically, the human detection unit 61 determines presence of a human in a position of the mobile device 500 identified by the detection result of the second sensor 201 to detect presence or absence, a position, and movement of the human in the room 100.

The first main control unit 54 controls the operation of the air purifier 1 using the information processed by the first information processing unit 60 as described above. Specifically, the first main control unit 54 performs air blowing control of the air purifier 1 based on the detection result of the human detection unit 61. Specifically, the first main control unit 54 constitutes the controller for performing the air blowing control of the air purifier 1 as the air blower based on the detection result of the first sensor 21 and the detection result of the second sensor 201 received by the receiving unit 51.

Other configurations are similar to those in Embodiment 1 or 2, and detailed descriptions thereof will be omitted.

Like Embodiment 1, the air blowing system configured as described above may reduce a region where the air blower cannot recognize a human in the space provided with the air blower, and achieve control of the air blower with a consideration for a human within a wider range in the space. Further, the sensor-mounted device is portable and the human carries the sensor-mounted device, and the position of the sensor-mounted device is detected to obtain the position of the human. This may improve detection accuracy of the position of the human.

INDUSTRIAL APPLICABILITY

The present invention may be applied to an air blower and an air blowing system for detecting a human in a space provided with the air blower, and performing air blowing control of the air blower based on the detection result.

REFERENCE SIGNS LIST

1 Air purifier, 2 Casing, 2A Partition, 3 Base, 4 Inlet, 5 Outlet, 6 Air blowing device, 7 Air trunk, 8 Purification device, 9 Movable louver, 10 Louver drive, 11 Opening variable mechanism, 12 Opening drive, 13 Rectification mechanism, 14 Horizontal rotation mechanism, 20 Dirt detection device, 21 First sensor, 40 Infrared sensor, 41 Multielement light receiving unit, 41a to 41h Light receiving elements, 42 Condenser lens, 43 Light distribution viewing angles, 44 Sensor operation unit, 51 Receiving unit, 52 Operation unit, 53 Time obtaining unit, 54 First main control unit, 55 Storage unit, 56 Display unit, 60 First information processing unit, 61 Human detection unit, 62 Environmental information obtaining unit, 63 Different sensor position grasping unit, 64 Sensor information integration unit, 65 Different device air blowing state obtaining unit, 66 Human presence detection unit, 100 Room, 101 Window, 102 Furniture, 200 Air conditioner, 201 Second sensor, 202 Second information processing unit, 203 Transmission unit, 204 Air blowing means, 205 Second main control unit, 301 First human detection range, 302 Second human detection range, 401 Human within the first human detection range, 402 Human within the second human detection range, 403 Human within both the human detection ranges, 500 Mobile device

The invention claimed is:

1. An air blower comprising:
a first sensor to detect a position of a human in a first human detection range;
a receiver to receive a detection result of a second sensor transmitted from a transmitter of a sensor-equipped device, wherein the sensor-equipped device includes the second sensor, which detects a position of a human in a second human detection range, and the transmitter, which transmits the detection result of the second sensor; and
a controller to perform, when the first sensor does not detect a human in the first human detection range and the second sensor detects a human in the second human detection range, air blowing control, which changes a direction of outlet air to outside of the first human detection range based on a relative position of the second sensor with respect to the first sensor, wherein the relative position of the second sensor is grasped based on a detection result of the first sensor and a detection result of the second sensor,
wherein the first sensor is part of the air blower and the second sensor is part of the sensor-equipped device, and the air blower and the sensor-equipped device are separate devices that are spaced apart from one another.

2. The air blower according to claim 1, wherein
the controller performs the air blowing control based on a position of a human or changes over time in the position of the human with respect to the first sensor,
the position of the human and the changes over time in the position of the human with respect to the first sensor are obtained by integrating, by using the relative position of the second sensor, the detection result of the first sensor and the detection result of the second sensor received by the receiver, and
the detection result of the second sensor with respect to the position of the second sensor is converted into the detection result with respect to the position of the first sensor by using the relative position of the second sensor with respect to the first sensor, and the converted detection result of the second sensor and the detection result of the first sensor are integrated.

3. The air blower according to claim 1, wherein
the controller further uses information on a space provided with the air blower to perform the air blowing control,
the information on the space is obtained based on the detection result of the first sensor and the detection result of the second sensor received by the receiver,
the information on the space includes at least one of a size and a layout of the space and positional relationships between the air blower and a wall, a window and a furniture of the space, and information on dust, pollen, an amount of bacteria, odor, temperature and humidity, illuminance, and sound in the space.

4. The air blower according to claim 1, further comprising a display to display the detection result of the first sensor and the detection result of the second sensor received by the receiver.

5. An air blower comprising:
a first sensor to detect a position of a human in a first human detection range;
a receiver to receive a detection result of a second sensor transmitted from a transmitter of a sensor-equipped device, wherein the sensor-equipped device includes the second sensor, which detects a position of a human in a second human detection range, and the transmitter, which transmits the detection result of the second sensor; and a controller to perform air blowing control, which changes any one or more of a direction, an amount and a speed of supply air, and a direction, an amount and a speed of outlet air, temperature, humidity, and a degree of purification based on the detection result of the first sensor, the detection result of the second sensor received by the receiver and a relative position of the second sensor with respect to the first sensor, wherein the relative position of the second sensor is grasped based on the detection result of the first sensor and the detection result of the second sensor, and the first sensor is part of the air blower and the second sensor is part of the sensor-equipped device, and the air blower and the sensor-equipped device are separate devices that are spaced apart from one another.

6. An air blowing system comprising:

an air blower including a first sensor to detect a position of a human in a first human detection range; and a sensor-equipped device including a second sensor, which detects a position of a human in a second human detection range, wherein the sensor-equipped device further includes a transmitter, which transmits a detection result of the second sensor, the air blower further includes:
  a receiver to receive the detection result of the second sensor transmitted from the transmitter; and
  a first controller to perform air blowing control which changes any one or more of a direction, an amount and a speed of supply air, and a direction, an amount and a speed of outlet air, temperature, humidity, and a degree of purification based on the detection result of the first sensor, the detection result of the second sensor received by the receiver and the relative position of the second sensor with respect to the first sensor, the relative position of the second sensor is grasped based on the detection result of the first sensor and the detection result of the second sensor, and the first sensor is part of the air blower and the second sensor is part of the sensor-equipped device, and the air blower and the sensor-equipped device are separate devices that are spaced apart from one another.

7. The air blowing system according to claim 6, wherein the sensor-equipped device further includes:
  an air blowing fan and a movable louver; and
  a second controller to control the air blowing fan and the movable louver based on the detection result of the second sensor, wherein the transmitter further transmits a control state of the air blowing fan and the movable louver by the second controller, and the first controller further uses the control state of the air blowing fan and the movable louver received by the receiver to perform the air blowing control.

8. The air blowing system according to claim 7, wherein the air blower is an air purifier, and the sensor-equipped device is an air conditioner.

9. The air blowing system according to claim 6, wherein the air blower and the sensor-equipped device are placed in different positions in a height direction.

* * * * *